United States Patent
Hayashi et al.

(10) Patent No.: US 11,084,292 B2
(45) Date of Patent: Aug. 10, 2021

(54) IMAGE-RECORDING APPARATUS INCLUDING FIRST TANK, SECOND TANK CONNECTABLE TO FIRST TANK, AND HEAD FOR EJECTING LIQUID SUPPLIED FROM SECOND TANK

(71) Applicant: BROTHER KOGYO KABUSHIKI KAISHA, Nagoya (JP)

(72) Inventors: Masahiro Hayashi, Nagoya (JP); Akinari Ishibe, Okazaki (JP); Yuma Tanabe, Nagoya (JP); Masatake Sato, Nagoya (JP); Akihito Kobayashi, Konan (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/590,693

(22) Filed: Oct. 2, 2019

(65) Prior Publication Data

US 2020/0031133 A1 Jan. 30, 2020

Related U.S. Application Data

(62) Division of application No. 15/904,675, filed on Feb. 26, 2018, now Pat. No. 10,442,206.

(30) Foreign Application Priority Data

Feb. 28, 2017 (JP) .............................. JP2017-037193
Feb. 28, 2017 (JP) .............................. JP2017-037194
(Continued)

(51) Int. Cl.
*B41J 2/175* (2006.01)
*B41J 2/14* (2006.01)
*C09D 11/40* (2014.01)

(52) U.S. Cl.
CPC ....... *B41J 2/17523* (2013.01); *B41J 2/14274* (2013.01); *B41J 2/17513* (2013.01); *B41J 2/17533* (2013.01); *C09D 11/40* (2013.01)

(58) Field of Classification Search
CPC B41J 2/17523; B41J 2/17513; B41J 2/17533; B41J 2/14274; C09D 11/40
See application file for complete search history.

(56) References Cited

U.S. PATENT DOCUMENTS 6,022,102 A * 2/2000 Ikkatai .................. B41J 2/1652
  347/85
2001/0024225 A1* 9/2001 Ishizawa .............. B41J 2/17596
  347/86
(Continued)

FOREIGN PATENT DOCUMENTS

| JP | 2001-301187 A | 10/2001 |
| JP | 2005-342992 A | 12/2005 |

(Continued)

*Primary Examiner* — Yaovi M Ameh
(74) *Attorney, Agent, or Firm* — Merchant & Gould P.C.

(57) ABSTRACT

An image-recording apparatus includes: a first tank defining a first storage chamber; a second tank defining a second storage chamber; a conveying mechanism for conveying sheets along a conveying path extending in a depthwise direction and a widthwise direction perpendicular to a vertical direction and the depthwise direction; and a recording head including a nozzle. Liquid in the first storage chamber is supplied through a communication port to the second storage chamber and then to the recording head through a liquid outlet port. The second storage chamber is positioned further in a first depthwise direction relative to the nozzle and further in a first widthwise direction relative to the conveying path. A volume of a prescribed space above a liquid level equal to a height of the communication port in the second storage chamber is greater than that of a liquid channel between the liquid outlet port and the nozzle.

4 Claims, 16 Drawing Sheets

(30) Foreign Application Priority Data

Feb. 28, 2017 (JP) .............................. JP2017-037195
Feb. 28, 2017 (JP) .............................. JP2017-037196

(56) References Cited

U.S. PATENT DOCUMENTS

| | | |
|---|---|---|
| 2005/0270347 A1 | 12/2005 | Yamamoto |
| 2007/0103520 A1* | 5/2007 | Wu ..................... B41J 2/17553 347/86 |
| 2009/0201351 A1 | 8/2009 | Shimizu et al. |
| 2015/0284170 A1 | 10/2015 | Igarshi et al. |

FOREIGN PATENT DOCUMENTS

| | | |
|---|---|---|
| JP | 2008-238792 A | 10/2008 |
| JP | 2015/199261 A | 11/2015 |

\* cited by examiner

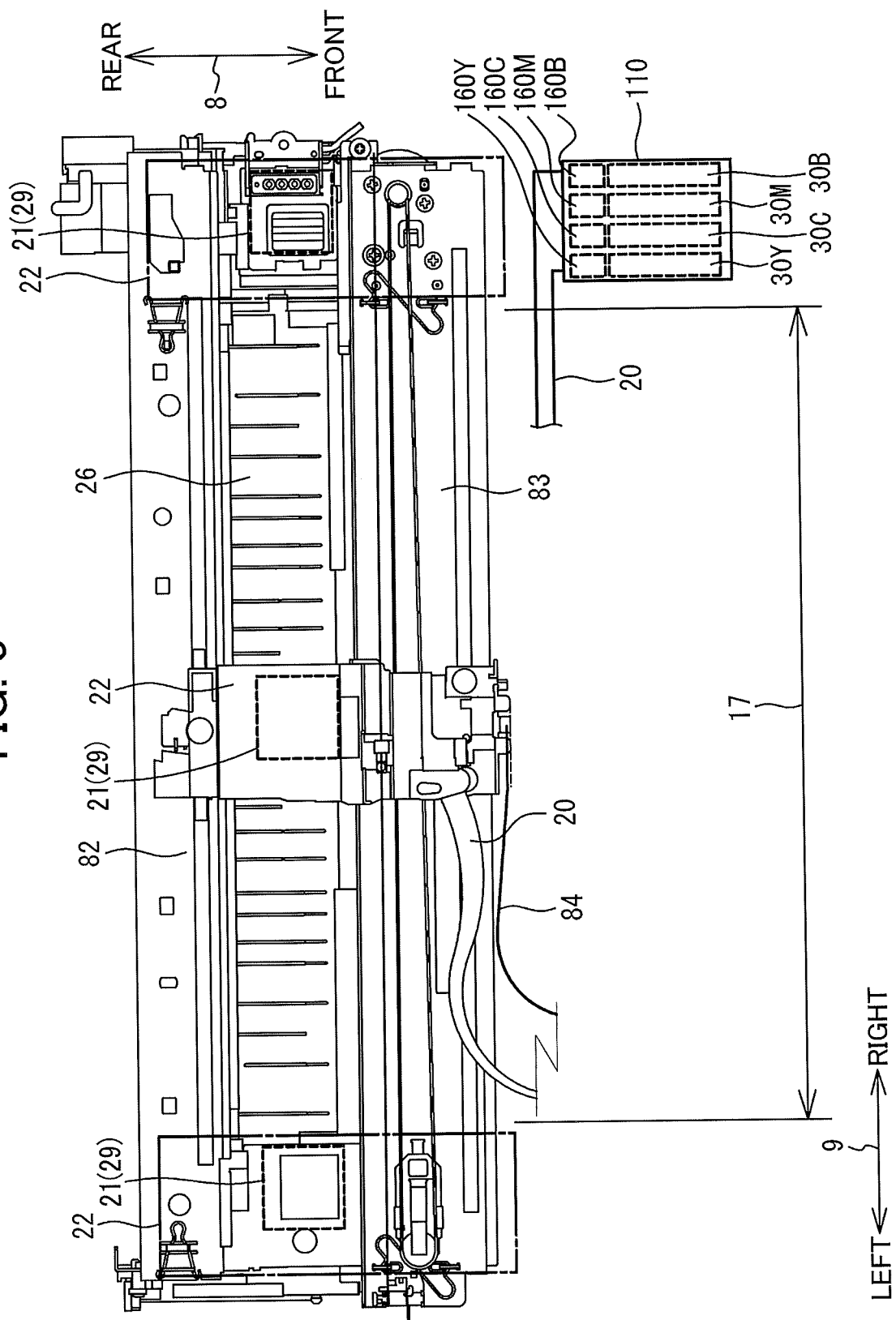

IMAGE-RECORDING APPARATUS INCLUDING FIRST TANK, SECOND TANK CONNECTABLE TO FIRST TANK, AND HEAD FOR EJECTING LIQUID SUPPLIED FROM SECOND TANK

CROSS REFERENCE TO RELATED APPLICATION

This application is a divisional of U.S. patent application Ser. No. 15/904,675 filed on Feb. 26, 2018 and further claims priorities from Japanese Patent Application Nos. 2017-037195 filed on Feb. 28, 2017, 2017-037193 filed on Feb. 28, 2017, 2017-037194 filed on Feb. 28, 2017, and 2017-037196 filed on Feb. 28, 2017. The entire contents of the above-mentioned applications are incorporated herein by reference.

TECHNICAL FIELD

The present disclosure relates to an image-recording apparatus provided with a plurality of liquid chambers in communication with one another. The present disclosure also relates to an image-recording apparatus provided with a liquid chamber for storing liquid and a head provided with nozzles for ejecting the liquid supplied from the liquid chamber.

BACKGROUND

Conventionally, there is known an image-recording apparatus that includes a plurality of liquid chambers in communication with one another. For example, Japanese Patent Application Publication No. 2015-199261 discloses an image-recording apparatus including a plurality of liquid chambers each partitioned into an upper chamber and a lower chamber by a partitioning wall. The upper and lower chambers of each liquid chamber are communicable with each other. The plurality of liquid chambers is made to communicate with the atmosphere through a common single air communication port. This image-recording apparatus also includes a head provided with nozzles through which liquid supplied from the liquid chambers is configured to be ejected.

In this image-recording apparatus, the lower chamber of each liquid chamber is directly in communication with the head including nozzles, while the upper chamber of each liquid chamber is not directly in communication with the head. In this configuration, in order to ensure reliable circulation of liquid, preferably, liquid stored in the upper chamber be used up before liquid stored in the lower chamber is used up. However, since the plurality of liquid chambers is made to communicate with the atmosphere through the common single air communication port, it is structurally difficult to allow liquid stored in one of the chambers to be used up earlier than the liquid stored in another chamber. Also, in this configuration, liquid supply to the head may be interrupted if the single air communication port becomes clogged or blocked for some reason.

Further, generally, the orientation of the image-recording apparatus may be changed during transportation. For example, while the image-recording apparatus should be used with its lower surface placed on a level surface to serve as a bottom of the image-recording apparatus (operable posture), the image-recording apparatus may be put in a vertical orientation with its left surface in the operable posture placed on the level surface to serve as the bottom of the image-recording apparatus (left-surface-down posture); or, with its rear surface in the operable posture placed on the level surface to serve as the bottom of the image-recording apparatus (rear-surface-down posture). If the image-recording apparatus is disposed in such unintended orientation, the head may be positioned below the liquid chambers, which may cause outflow of the liquid from the liquid chamber to the head that directly communicates with the liquid chamber, possibly resulting in leakage of liquid from the head.

In order to prevent such leakage of the liquid, in the above-mentioned image-recording apparatus, a liquid outlet port for discharging the liquid in the liquid chamber to the head is arranged to be positioned upward relative to a liquid level of the liquid within the liquid chamber even if the orientation of the image-recording apparatus is changed.

SUMMARY

In order to allow liquid stored in one of a plurality of liquid chambers to be consumed before liquid stored in another one of the plurality of chambers, a plurality of air communication ports may be provided each corresponding to each of the plurality of liquid chambers so that each air communication port may be controlled independently. Further, owing to the provision of the plurality of air communication ports, even if one of the air communication ports is blocked, communication with the atmosphere can be made through other air communication ports to maintain liquid supply to the head.

However, even if the plurality of air communication ports is provided, leakage of liquid from the head may occur if the head becomes located below the liquid chambers as a result of change in posture of the image-recording apparatus from its operable posture.

Further, even if the liquid outlet port is arranged to be positioned higher than the liquid level of the liquid in each liquid chamber, there still remains a possibility that leakage of liquid from the head may occur in case that the image-recording apparatus is placed in postures other than the operable posture.

For example, assume a case where liquid stored in a separate chamber (for example, an ink chamber formed in an ink cartridge attached to an image-recording apparatus) is adapted to flow into the liquid chamber provided in the image-recording apparatus. If this image-recording apparatus is displaced from the operable posture into the left-surface-down posture, for example, a large amount of liquid stored in the separate chamber may flow into the liquid chamber of the apparatus, possibly causing the liquid level in the liquid chamber to rise higher than the liquid outlet port. As a result, the liquid may flow out of the liquid chamber into the head, possibly resulting in leakage of liquid from the head.

Further, the image-recording apparatus may be subject to vibration during transportation. Such vibration during transportation may cause foaming of ink within the liquid chamber. The generated bubbles containing ink may grow to reach the liquid surface or to become higher, possibly allowing the ink bubbles to flow out through the liquid outlet port, possibly resulting in outflow of the ink bubbles through the head.

Still further, in a state where the liquid outlet port is positioned higher than the liquid level in the image-recording apparatus disposed in the left-surface-down posture, for example, air, instead of the liquid, is discharged through the liquid outlet port. The discharged air flows into a space between the head and the liquid outlet port, which may prevent ink outflow from the head. However, the amount of air within the liquid chamber may be insufficient for filling the space between the head and the liquid outlet port. In order to secure sufficient amount of air to fill the space, the volume of the liquid chamber needs to be larger, leading to increase in size of the image-recording apparatus.

In view of the foregoing, it is an object of the disclosure to provide an image-recording apparatus capable of suppressing leakage of liquid stored in a liquid chamber through a head even if the image-recording apparatus is placed in such an orientation that the head is positioned below the liquid chamber.

It is another object of the disclosure to provide an image-recording apparatus capable of securing a sufficient amount of air to be supplied to a head to restrain outflow of liquid stored in a liquid chamber from the head.

In order to attain the above and other objects, according to one aspect, the disclosure provides an image-recording apparatus including a first tank, a second tank, a conveying mechanism, and a recording head. The first tank includes: a first storage chamber configured to store liquid; and a first air communication portion configured to allow the first storage chamber to communicate with an atmosphere. The second tank includes: a communication port configured to communicate with the first storage chamber; a second storage chamber in communication with the communication port and configured to store the liquid supplied from the first storage chamber through the communication port; a second air communication portion configured to allow the second storage chamber to communicate with the atmosphere through a route different from a route of the first air communication portion; and a liquid outlet port through which the liquid stored in the second storage chamber is configured to be discharged. The conveying mechanism is configured to convey a sheet along a conveying path extending in a depthwise direction perpendicular to a vertical direction. The depthwise direction includes a first depthwise direction and a second depthwise direction opposite to each other. The conveying path has a width in a widthwise direction perpendicular to the vertical direction and the depthwise direction. The widthwise direction includes a first widthwise direction and a second widthwise direction opposite to each other. The recording head is positioned above the conveying path and in communication with the liquid outlet port through a liquid channel. The recording head has a nozzle through which the liquid supplied from the liquid outlet port through the liquid channel is configured to be ejected toward the conveying path. The second storage chamber is positioned further in the first depthwise direction relative to the nozzle and is positioned further in the first widthwise direction relative to the conveying path. The liquid outlet port is configured to discharge the liquid out of the second storage chamber at a position below a center of the second storage chamber in the vertical direction, and at the position further in the first depthwise direction relative to a depthwise center of the second storage chamber, and at the position further in the first widthwise direction relative to a widthwise center of the second storage chamber. The second storage chamber defines a prescribed space positioned above a prescribed liquid level equal to a height of the communication port in the vertical direction. The prescribed space is positioned further in the second widthwise direction relative to the liquid outlet port. The prescribed space provides a volume greater than a volume of the liquid channel between the liquid outlet port and the nozzle.

According to another aspect, there is provided an image-recording apparatus including a first tank, a second tank, and a recording head. The first tank includes: a first storage chamber configured to store liquid; a liquid supply port through which the liquid in the first storage chamber is configured to be supplied; and a first air communication portion configured to allow the first storage chamber to communicate with an atmosphere. The second tank includes: a liquid inlet port through which the liquid supplied through the liquid supply port is configured to be introduced; a second storage chamber configured to store the liquid introduced through the liquid inlet port, the second storage chamber defining a depth in a depthwise direction perpendicular to a vertical direction; a liquid outlet port through which the liquid stored in the second storage chamber is configured to be discharged; and a second air communication portion configured to allow the second storage chamber to communicate with the atmosphere. The depthwise direction includes a first depthwise direction and a second depthwise direction opposite to each other. The recording head is in communication with the liquid outlet port through a liquid channel. The recording head has a nozzle through which the liquid supplied through the liquid channel is configured to be ejected. The second storage chamber is positioned further in the first depthwise direction relative to the nozzle. The second storage chamber includes a liquid-storage space and an air-communication space, the liquid-storage space being defined as a space positioned below a liquid level provided by a stipulated maximum amount of liquid that can be stored in the second storage chamber, the air-communication space being defined as a space positioned above the liquid level of the liquid. The liquid inlet port and the liquid outlet port are in communication with the liquid-storage space. The first storage chamber is partitioned by a wall portion into an upper space above the wall portion and a lower space below the wall portion. The wall portion extends in the first depthwise direction from a partitioning surface defining the first storage chamber and facing in the first depthwise direction. The wall portion has a gap through which the upper space and the lower space are allowed to communicate with each other. The liquid supply port is in communication with the lower space of the first storage chamber. The air-communication space of the second storage chamber has a prescribed portion positioned further in the second depthwise direction relative to the liquid outlet port, the prescribed portion of the air-communication space of the second storage chamber having a volume greater than a sum of a volume of the lower space of the first storage chamber and a volume of a portion of the liquid-storage space positioned further in the first depthwise direction relative to the liquid outlet port.

According to still another aspect, there is provided an image-recording apparatus including a tank, a conveying mechanism, and a recording head. The tank includes: a liquid inlet port through which liquid is introduced; a liquid storage chamber configured to store the liquid flowing through the liquid inlet port; a liquid outlet port through which the liquid in the liquid storage chamber is configured to be discharged; and an air communication portion configured to allow the liquid storage chamber to communicate with an atmosphere. The conveying mechanism is configured to convey a sheet along a conveying path extending in a depthwise direction perpendicular to a vertical direction. The depthwise direction includes a first depthwise direction and a second depthwise direction opposite to each other. The conveying path has a width in a widthwise direction perpendicular to the vertical direction and the depthwise direction. The widthwise direction includes a first widthwise direction and a second widthwise direction opposite to each other. The recording head is positioned above the conveying path and in communication with the liquid outlet port through a liquid channel. The recording head has a nozzle through which the liquid supplied through the liquid channel is configured to be ejected toward the conveying path. The second storage chamber is positioned further in the first depthwise direction relative to the nozzle and is positioned further in the first widthwise direction relative to the conveying path. The liquid outlet port is configured to discharge the liquid out of the second storage chamber at a position below a center of the second storage chamber in the vertical direction, and at the position further in the first depthwise direction relative to a depthwise center of the second storage chamber, and at the position further in the first widthwise direction relative to a widthwise center of the second storage chamber. The liquid storage chamber includes a buffer chamber, a first chamber and a second chamber. The buffer chamber is positioned further in the second widthwise direction relative to the liquid outlet port. The buffer chamber is defined as a space positioned above a specific level of the liquid equal to a height of the liquid inlet port with respect to the vertical direction. The first chamber is positioned below the buffer chamber and in communication with the liquid outlet port. The second chamber connects the buffer chamber and the first chamber to each other. The second chamber has a horizontal cross-sectional area smaller than a horizontal cross-sectional area of the buffer chamber and smaller than a horizontal cross-sectional area of the first chamber.

According to still another aspect, there is provided an image-recording apparatus including a first tank, a second tank, a conveying mechanism, and a recording head. The first tank includes: a first storage chamber configured to store liquid; a liquid supply port through which the liquid in the first storage chamber is configured to be supplied; and a first air communication passage through which the first storage chamber is allowed to communicate with an atmosphere. The second tank includes: a liquid inlet port through which the liquid supplied through the liquid supply port is configured to be introduced; a second storage chamber configured to store the liquid introduced through the liquid inlet port; a liquid outlet port through which the liquid stored in the second storage chamber is configured to be discharged; and a second air communication passage configured to allow the second storage chamber to communicate with the atmosphere. The conveying mechanism is configured to convey a sheet along a conveying path extending in a depthwise direction perpendicular to a vertical direction. The depthwise direction includes a first depthwise direction and a second depthwise direction opposite to each other. The conveying path has a width in a widthwise direction perpendicular to the vertical direction and the depthwise direction. The widthwise direction includes a first widthwise direction and a second widthwise direction opposite to each other. The recording head is positioned above the conveying path and in communication with the liquid outlet port through a liquid channel. The recording head has a nozzle through which the liquid supplied through the liquid channel is configured to be ejected toward the conveying path. The second storage chamber is positioned further in the first depthwise direction relative to the nozzle and is positioned further in the first widthwise direction relative to the conveying path. The liquid outlet port is configured to discharge the liquid from the second storage chamber at a position below a center of the second storage chamber in the vertical direction, and at the position further in the first widthwise direction relative to a widthwise center of the second storage chamber. The liquid outlet port is positioned further in the first widthwise direction relative to the liquid inlet port and the first storage chamber.

BRIEF DESCRIPTION OF THE DRAWINGS

The particular features and advantages of the embodiment (s) as well as other objects will become apparent from the following description taken in connection with the accompanying drawings, in which:

FIG. 3 is a plan view illustrating arrangement of a carriage and a platen relative to a cartridge-attachment portion of the multifunction peripheral according to the embodiment;

DETAILED DESCRIPTION

Figure 1A:
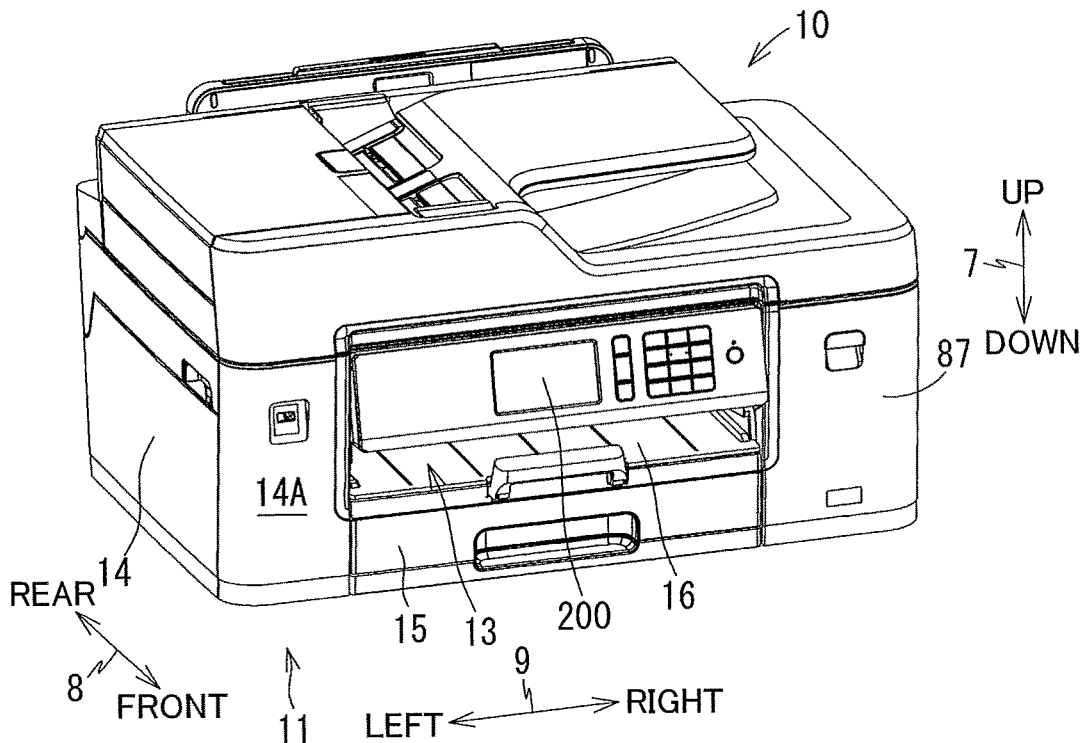
FIG. 1A is a perspective view of a multifunction peripheral according to an embodiment, illustrating a closed position of a cover of the multifunction peripheral.

A multifunction peripheral 10 as an example of an image-recording apparatus according to one embodiment will be described with reference to the accompanying drawings, wherein like parts and components are designated by the same reference numerals to avoid duplicating description.

In the following description, up, down, front, rear, left, and right directions related to the multifunction peripheral 10 will be referred to assuming that the multifunction peripheral 10 is disposed on a horizontal plane so as to be operable, as shown in FIG. 1A. Note that this posture of the multifunction peripheral 10 illustrated in FIG. 1A will also be referred to as an "operable posture". Specifically, an up-down direction 7 of the multifunction peripheral 10 is defined based on the operable posture of the multifunction peripheral 10. A front-rear direction 8 is defined assuming that a surface of the multifunction peripheral 10 formed with an opening 13 is a front surface 14A of the multifunction peripheral 10 in the operable posture. A left-right direction 9 is defined based on an assumption that the multifunction peripheral 10 in the operable posture is viewed from its front surface. In the present embodiment, in the operable posture of the multifunction peripheral 10, the up-down direction 7 is parallel to a vertical direction, and the front-rear direction 8 and the left-right direction 9 are parallel to a horizontal direction. Further, the front-rear direction 8 is perpendicular to the left-right direction 9.

[Overall Structure of Multifunction Peripheral 10]

Figure 1B:
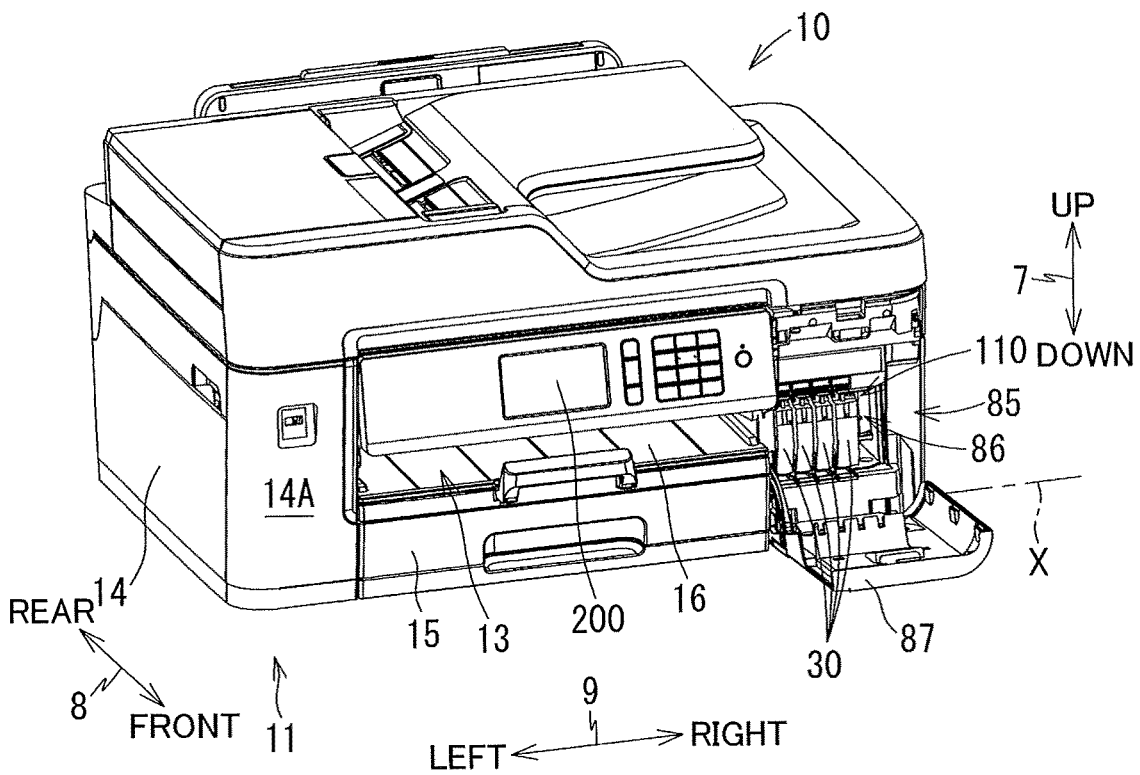
FIG. 1B is a perspective view of the multifunction peripheral according to the embodiment, illustrating an open position of the cover.

As illustrated in FIGS. 1A and 1B, the multifunction peripheral 10 has a substantially rectangular parallelepiped shape. The multifunction peripheral 10 has a lower portion in which a printer portion 11 is provided. The printer portion 11 is configured to record an image on a sheet of paper 12 (see FIG. 2) based on an inkjet recording method. The printer portion 11 includes a casing 14 whose front surface 14A is formed with the opening 13. On the front surface 14A, a display 200 is also provided to display various information thereon.

Figure 2:
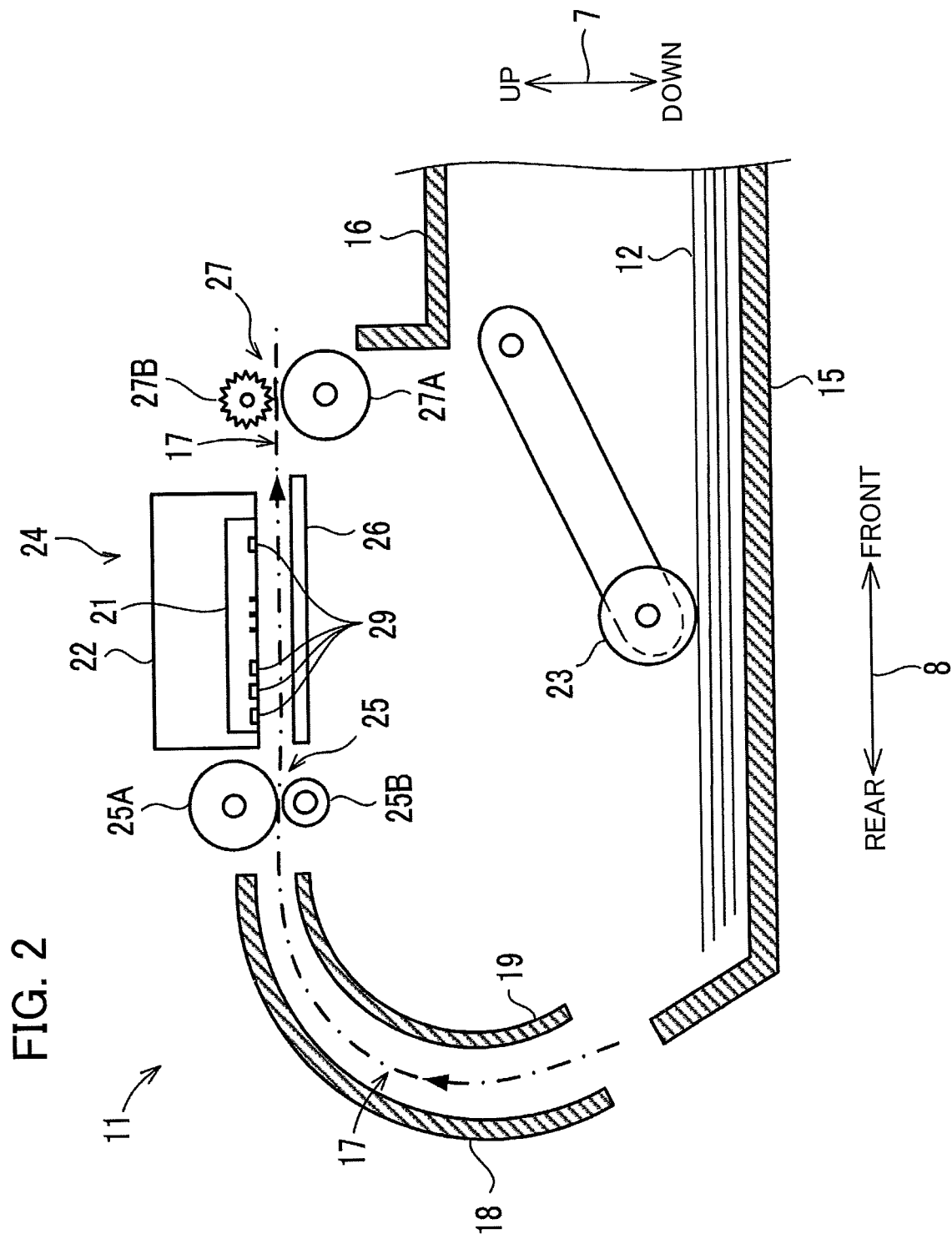
FIG. 2 is a vertical cross-sectional view schematically illustrating an internal configuration of a printer portion of the multifunction peripheral according to the embodiment.

As illustrated in FIG. 2, within the casing 14, a feeding roller 23, a feeding tray 15, a discharge tray 16, a pair of conveying rollers 25, a recording portion 24, a pair of discharging rollers 27, a platen 26, and a cartridge-attachment portion 110 (see FIG. 1B) are disposed. The multifunction peripheral 10 has various functions such as a facsimile function and a printing function.

<Feeding Tray 15, Discharge Tray 16, and Feeding Roller 23>

As illustrated in FIGS. 1A and 1B, the feeding tray 15 is configured to be inserted into and extracted from the casing 14 through the opening 13 in the front-rear direction 8 by a user. The opening 13 is positioned at a center portion of the front surface 14A of the casing 14 in the left-right direction 9. As illustrated in FIG. 2, the feeding tray 15 is configured to support the sheets 12 in a stacked state.

The discharge tray 16 is disposed above the feeding tray 15. The discharge tray 16 is configured to support the sheets 12 discharged by the discharging rollers 27.

The feeding roller 23 is configured to feed each of the sheets 12 supported in the feeding tray 15 onto a conveying path 17. The feeding roller 23 is configured to be driven by a feeding motor 172 (see FIG. 12).

<Conveying Path 17>

As illustrated in FIG. 2, the conveying path 17 is a space partially defined by an outer guide member 18 and an inner guide member 19 opposing each other at a predetermined interval inside the printer portion 11. The conveying path 17 extends rearward from a rear end portion of the feeding tray 15, and then, makes a U-turn frontward while extending upward at a rear portion of the printer portion 11, passes through a space between the recording portion 24 and the platen 26, and reaches the discharge tray 16. A portion of the conveying path 17 positioned between the conveying rollers 25 and the discharging rollers 27 is provided substantially at a center portion of the multifunction peripheral 10 in the left-right direction 9, and extends in the front-rear direction 8. A conveying direction of each sheet 12 in the conveying path 17 is indicated by a dashed-dotted arrow in FIG. 2.

<Conveying Rollers 25>

As illustrated in FIG. 2, the pair of conveying rollers 25 is disposed at the conveying path 17. The conveying rollers 25 include a conveying roller 25A and a pinch roller 25B arranged to oppose each other. The conveying roller 25A is configured to be driven by a conveying motor 171 (see FIG. 12). The pinch roller 25B is configured to be rotated following rotation of the conveying roller 25A. As the conveying roller 25A makes forward rotation in response to forward rotation of the conveying motor 171, each of the sheets 12 is nipped between the conveying roller 25A and the pinch roller 25B to be conveyed in the conveying direction (i.e., frontward direction).

<Discharging Rollers 27>

As illustrated in FIG. 2, the pair of discharging rollers 27 is disposed downstream relative to the pair of conveying rollers 25 in the conveying direction at the conveying path 17. The discharging rollers 27 include a discharging roller 27A and a spur 27B arranged to oppose each other. The discharging roller 27A is configured to be driven by the conveying motor 171 (see FIG. 12). The spur 27B is configured to be rotated following rotation of the discharging roller 27A. As the discharging roller 27A makes forward rotation in response to the forward rotation of the conveying motor 171, each sheet 12 is nipped between the discharging roller 27A and the spur 27B and is conveyed in the conveying direction (i.e., frontward direction).

<Recording Portion 24>

As illustrated in FIG. 2, the recording portion 24 is disposed a position between the conveying rollers 25 and the discharging rollers 27 at the conveying path 17. The recording portion 24 is arranged to oppose the platen 26 in the up-down direction 7, with the conveying path 17 interposed between the recording portion 24 and the platen 26. The recording portion 24 is positioned above the conveying path 17, while the platen 26 is positioned below the conveying path 17. The recording portion 24 includes a carriage 22 and a recording head 21.

As illustrated in FIG. 3, the carriage 22 is supported by guide rails 82 and 83. The guide rails 82 and 83 extend in the left-right direction 9 and are spaced apart from each other in the front-rear direction 8. The guide rails 82 and 83 are supported by a frame (not shown) of the printer portion 11. The carriage 22 is connected to a well-known belt mechanism provided at the guide rail 83. The belt mechanism is driven by a carriage-driving motor 173 (see FIG. 12). The carriage 22 connected to the belt mechanism is configured to make reciprocating movements in the left-right direction 9 in response to driving by the carriage-driving motor 173. The carriage 22 is configured to move within a range from a right side relative to a right end of the conveyance path 17 to a left side relative to a left end of the conveyance path 17, as indicated by alternate long and short dash lines in FIG. 3.

As illustrated in FIG. 3, a bundle of ink tubes 20 and a flexible flat cable 84 extend from the carriage 22.

The ink tubes 20 connect the cartridge-attachment portion 110 (see FIG. 1B) to the recording head 21. Each of the ink tubes 20 is configured to supply ink stored in a corresponding ink cartridge 30 attached to the cartridge-attachment portion 110 to the recording head 21. In the present embodiment, four ink cartridges 30 are configured to be attached to the cartridge-attachment portion 110. Specifically, the four ink cartridges 30 include: an ink cartridge 30B storing black ink, an ink cartridge 30M storing ink of magenta in color, an ink cartridge 30C storing ink of cyan in color, and an ink cartridge 30Y storing ink of yellow in color. These four ink cartridges 30B, 30M, 30C and 30M will be collectively referred to as "ink cartridges 30", hereinafter. Four ink tubes 20 are provided in one-to-one correspondence with the respective ink cartridges 30B, 30M, 30C and 30M so that ink of respective four colors (black, magenta, cyan, and yellow) can flow through the corresponding internal spaces of the ink tubes 20. These four ink tubes 20 are bundled and connected to the recording head 21 mounted on the carriage 22.

The flexible flat cable 84 is configured to establish electrical connection between a controller 130 (see FIG. 12) and the recording head 21. The flexible flat cable 84 is configured to transmit control signals outputted from the controller 130 to the recording head 21.

As illustrated in FIG. 2, the recording head 21 is mounted on the carriage 22. The recording head 21 includes a plurality of nozzles 29 and a plurality of piezoelectric elements 56 (see FIG. 12). The nozzles 29 are arranged at a lower surface of the recording head 21. Ink flow passages are formed in the recording head 21. The piezoelectric elements 56 are configured to deform a portion of the ink flow passages to allow ink droplets to be ejected through the nozzles 29. As will be described later in detail, the piezoelectric elements 56 are configured to operate upon receipt of electric power supplied by the controller 130.

The recording portion 24 is configured to be controlled by the controller 130. As the carriage 22 moves in the left-right direction 9, the recording head 21 ejects ink droplets, through the nozzles 29, toward the conveying path 17, i.e., onto the sheet 12 supported by the platen 26. In this way, an image is recorded on each sheet 12 supported by the platen 26, and the ink stored in each of the ink cartridges 30 is consumed.

<Platen 26>

As illustrated in FIG. 2, the platen 26 is disposed between the conveying rollers 25 and the discharging rollers 27 at the conveying path 17. The platen 26 is arranged to oppose the recording portion 24 in the up-down direction 7, with the conveying path 17 interposed between the platen 26 and the recording portion 24. The platen 26 supports the sheet 12 conveyed by the conveying rollers 25 from below.

<Cover 87>

As illustrated in FIG. 1B, an opening 85 is formed in the front surface 14A of the casing 14 at a right end portion thereof. Rearward of the opening 85, an accommodation space 86 is formed to accommodate the cartridge-attachment portion 110 therein. A cover 87 is assembled to the casing 14 so as to be capable of covering the opening 85. The cover 87 is pivotally movable, about a pivot axis X (pivot center) extending in the left-right direction 9, between a closed position (a position illustrated in FIG. 1A) for closing the opening 85 and an open position (a position illustrated in FIG. 1B) for exposing the opening 85.

<Cartridge-Attachment Portion 110>

As illustrated in FIG. 1B, the cartridge-attachment portion 110 is positioned in a right-front portion on the casing 14. More specifically, as illustrated in FIG. 3, the cartridge-attachment portion 110 is disposed at a position frontward relative to the recording head 21 and rightward relative to the conveying path 17.

As illustrated in FIGS. 4A through 6, the cartridge-attachment portion 110 includes a case 101, contacts 106, rods 125, attachment sensors 113, a lock shaft 145, tanks 103, and liquid-level sensors 55.

The four ink cartridges 30 corresponding to the four colors of ink (cyan, magenta, yellow, and black) are detachably attachable to the cartridge-attachment portion 110. Specifically, the respective ink cartridges 30 are configured to be attached to the case 101 by being moved rearward, and detached from the case 101 by being moved frontward. One set of four contacts 106, one rod 125, one attachment sensor 113, one tank 103, and one liquid-level sensor 55 are provided for each of the four ink cartridges 30. Thus, in the present embodiment, four sets of the four contacts 106, four rods 125, four attachment sensors 113, four tanks 103, and four liquid-level sensors 55 are provided at the cartridge-attachment portion 110. Note that the number of the ink cartridges 30 that can be accommodated in the cartridge-attachment portion 110 is not limited to four, but may be any number.

The four sets of the contacts 106 have the same configurations as one another. The four rods 125 have the same configurations as one another. Likewise, the four attachment sensors 113 have the same configurations as one another. And the four liquid-level sensors 55 have the same configurations as one another. Accordingly, hereinafter, descriptions will be made only about one of the four sets of contacts 106, one of the four rods 125, one of the four attachment sensors 113 and one of the four liquid-level sensors 55, while descriptions for the remaining three of these components will be omitted for simplifying description.

Also note that each of the four tanks 103 is configured to store one of four colors of ink among black, cyan, magenta and yellow. Specifically, hereinafter, a tank 103 storing black ink will be referred to as "tank 103B", a tank 103 storing ink of magenta color will be referred to as "tank 103M", a tank 103 storing ink of cyan color will be referred to as "tank 103C", and a tank 103 storing ink of yellow color will be referred to as "tank 103Y". These four tanks 103B, 103M, 103C and 103Y will be collectively referred to as "tanks 103", hereinafter.

<Case 101>

Figure 4A:
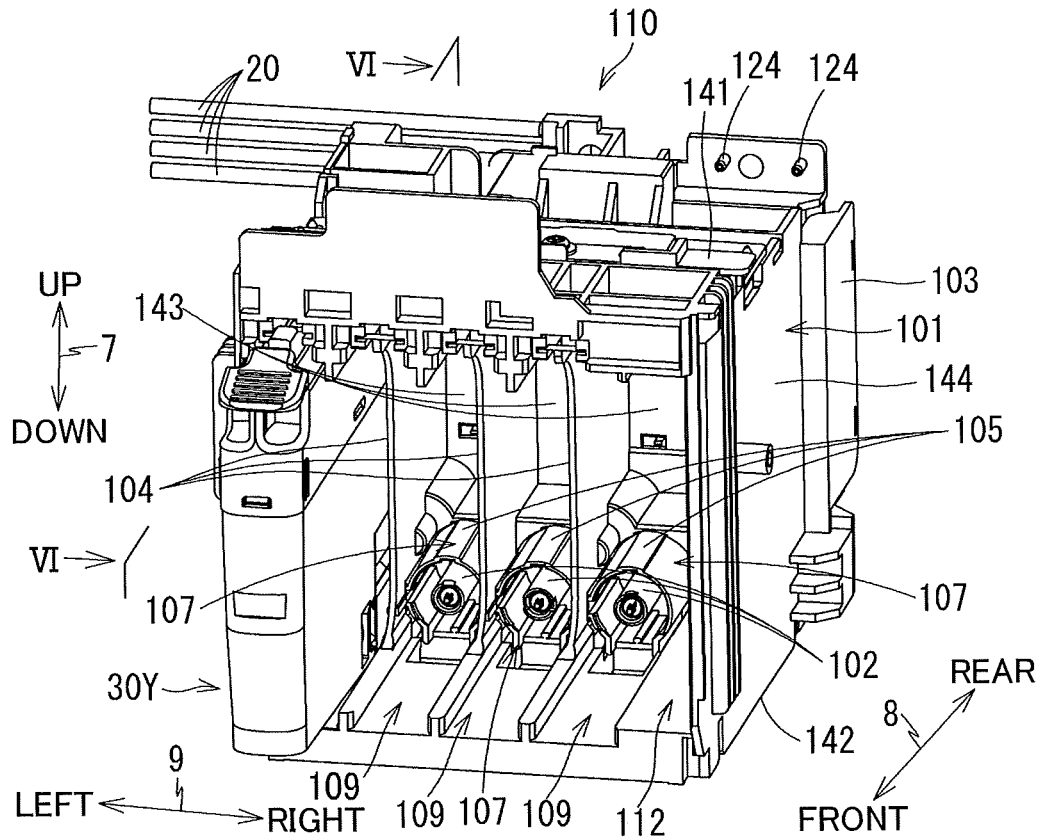
FIG. 4A is a perspective view illustrating an exterior of the cartridge-attachment portion according to the embodiment as viewed from an upper-front side thereof at which an opening is formed, illustrating a state where an ink cartridge 30Y is attached to the cartridge-attachment portion.
Figure 4B:
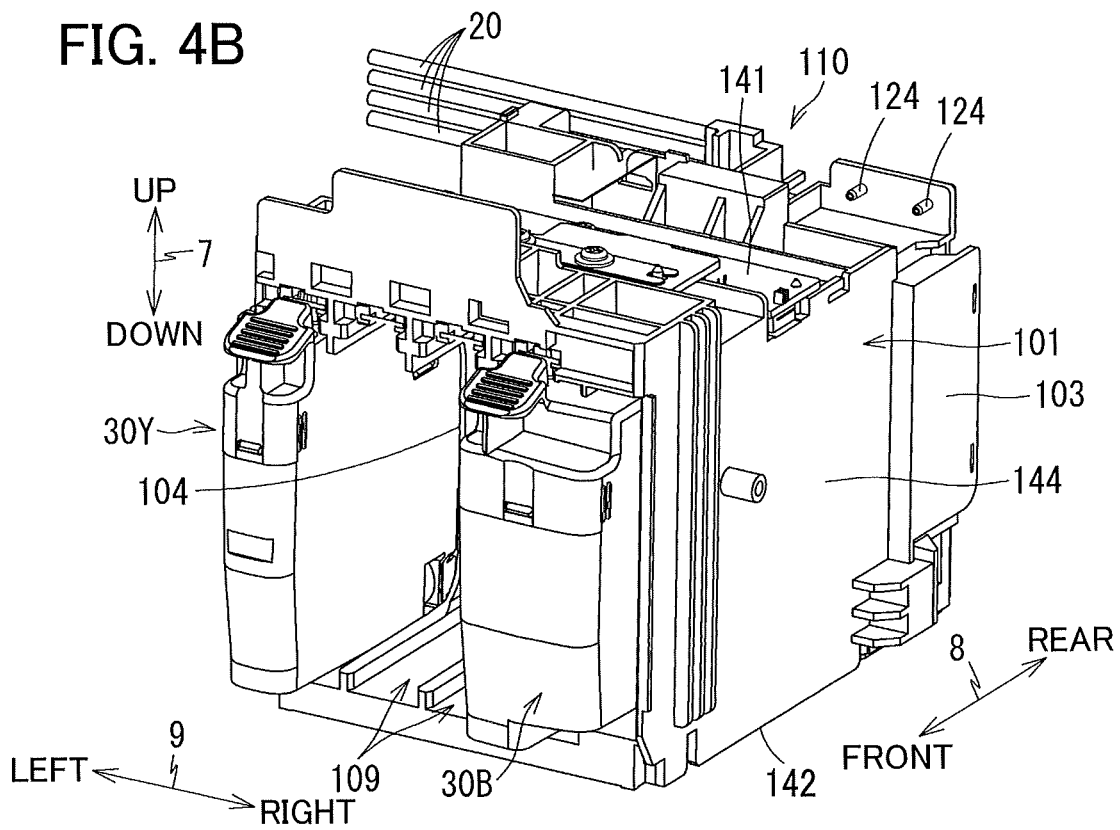
FIG. 4B is a perspective view illustrating the exterior of the cartridge-attachment portion according to the embodiment an upper-front and right side thereof, illustrating a state where ink cartridges 30Y and 30B are attached to the cartridge-attachment portion.
Figure 5:
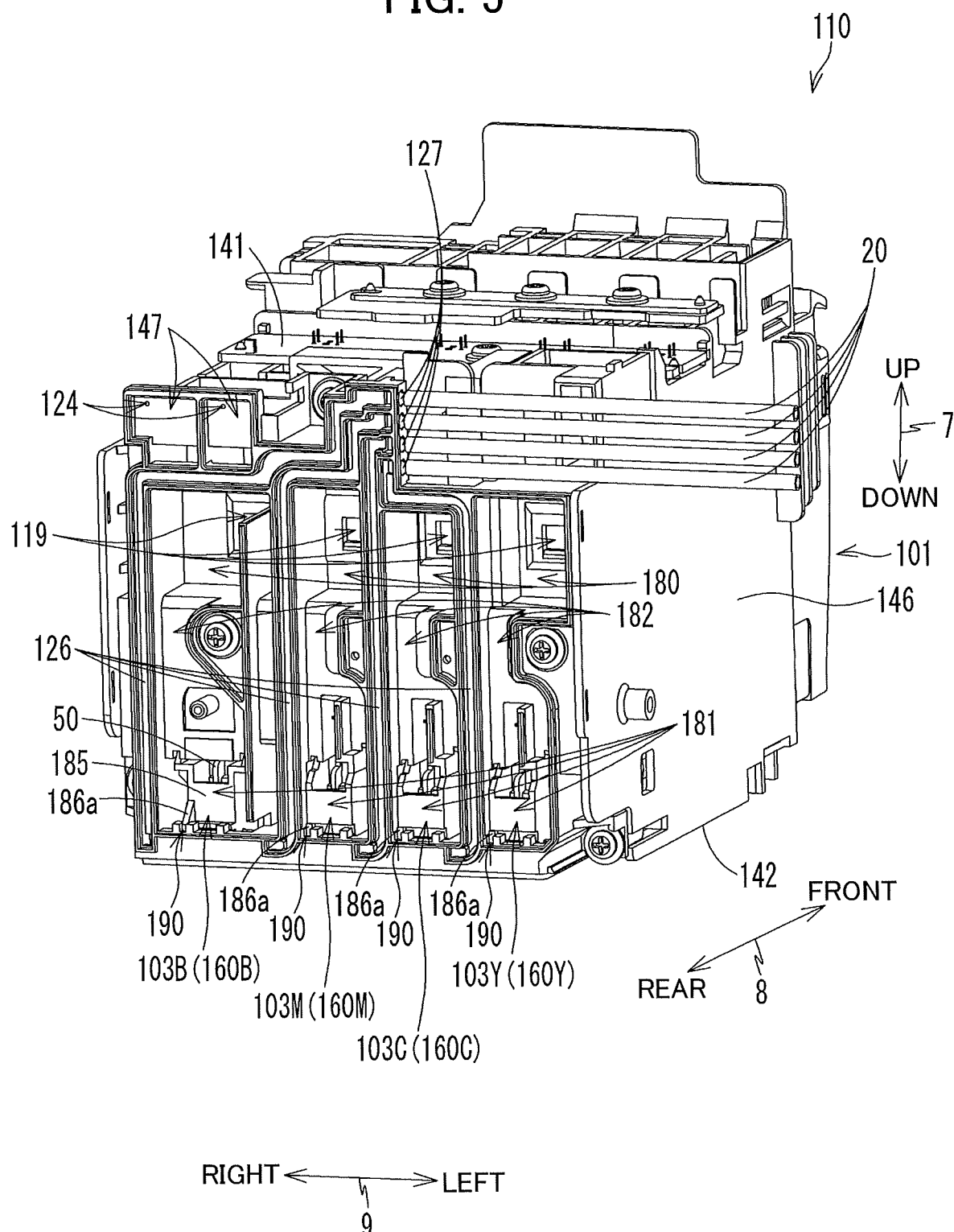
FIG. 5 is a perspective view illustrating the external appearance of the cartridge-attachment portion according to the embodiment as viewed from a side thereof at which tanks are disposed.
Figure 6:
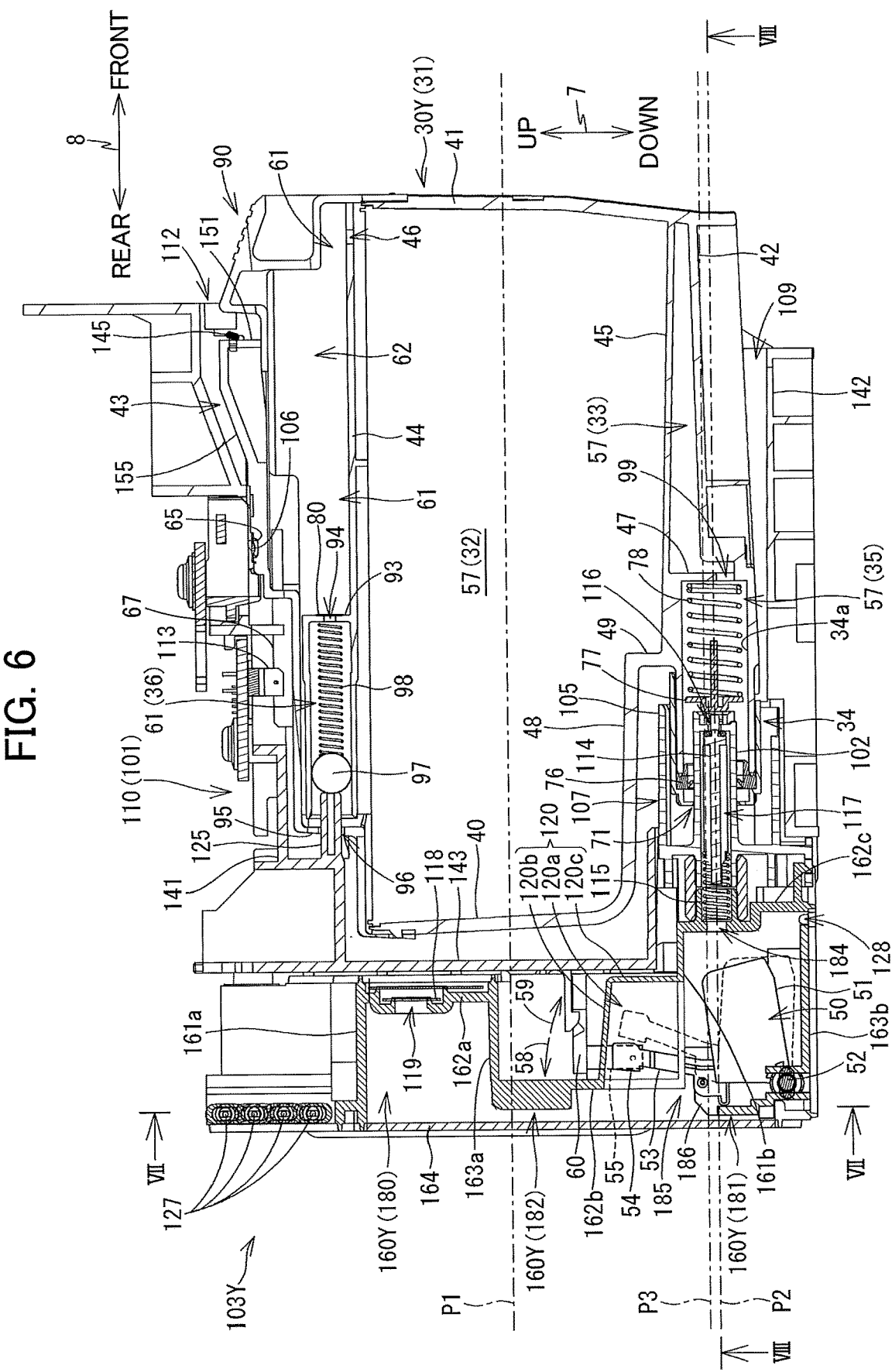
FIG. 6 is a cross-sectional view of the cartridge-attachment portion according to the embodiment taken along a plane VI-VI shown in FIG. 4A, illustrating a state where the ink cartridge 30Y is attached to the cartridge-attachment portion.

As illustrated in FIGS. 4 through 6, the case 101 has a box-like shape defining an internal space therein. The case 101 has a depth in the front-rear direction 8, a width in the left-right direction 9 and a height in the up-down direction 7. Specifically, the case 101 includes: a ceiling wall 141 defining an upper end; a bottom wall 142 defining a bottom end; an end wall 143 defining a rear end in the front-rear direction 8; and a pair of side walls 144 and 146 defining right and left ends in the left-right direction 9. The ceiling wall 141, bottom wall 142, end wall 143 and the pair of side walls 144 and 146 defines the internal space of the case 101. A front end of the case 101, which opposes the end wall 143 in the front-rear direction 8, is formed as an opening 112. The internal space of the case 101 is exposed to the outside through the opening 112. The opening 112 can be exposed to the outside of the multifunction peripheral 10 through the opening 85 of the casing 14 when the cover 87 is at the open position shown in FIG. 1B.

The ink cartridges 30 can be inserted into and extracted from the case 101 through the opening 85 of the casing 14 and the opening 112 of the cartridge-attachment portion 110. In the case 101, the bottom wall 142 is formed with four guide grooves 109 (see FIGS. 4A and 4B) for guiding insertion and extraction of the respective ink cartridges 30 in the front-rear direction 8. Movements of the ink cartridges 30 in the front-rear direction 8 are guided by the corresponding guide grooves 109 as lower end portions of the ink cartridges 30 are inserted into the corresponding guide grooves 109. As illustrated in FIG. 4A, the case 101 is also provided with three plates 104 that partition the internal space of the case 101 into four individual spaces each elongated in the up-down direction 7. Each of the four spaces partitioned by the plates 104 is configured to receive one of the four ink cartridges 30. The ink cartridges 30 accommodated in the respective spaces of the case 101 are juxtaposed with one another in the left-right direction 9.

Note that FIG. 4A illustrates a state where only one of the four ink cartridges 30, i.e., the ink cartridge 30Y, is attached to the cartridge-attachment portion 110. FIG. 4B illustrates a state where two of the ink cartridges 30, i.e., the ink cartridges 30Y and 30B, are attached to the cartridge-attachment portion 110.

<Contacts 106>

As illustrated in FIG. 6, each set of the four contacts 106 is provided on a lower surface of the ceiling wall 141 of the case 101. Each of the four contacts 106 in each set protrudes downward toward the internal space of the case 101 from the lower surface of the ceiling wall 141. Although not illustrated in detail in the drawings, in each set, the four contacts 106 are arranged spaced apart from one another in the left-right direction 9. The four sets of the four contacts 106 are provided each set for each one of the four ink cartridges 30 that can be accommodated in the case 101. The four contacts 106 in each set is arranged each at a position corresponding to one of four electrodes 65 (described later) of the ink cartridge 30. Each contact 106 is made of a material having electrical conductivity and resiliency. The contacts 106 are therefore upwardly resiliently deformable. Note that the number of the contacts 106 and the number of electrodes 65 may be arbitrary.

Each contact 106 is electrically connected to the controller 130 (see FIG. 12) via an electrical circuit. When the contacts 106 are respectively engaged with the corresponding electrodes 65 and electrically connected thereto, a certain voltage is applied to one of the electrodes 65, another one of the electrodes 65 is grounded, and electric power is supplied to still another one of the electrodes 65, for example. Due to establishment of the electrical connection between the contacts 106 and the corresponding electrodes 65, the controller 130 is allowed to access data stored in an IC of the corresponding ink cartridge 30. Outputs from the electrical circuits are configured to be inputted into the controller 130.

<Rod 125>

As illustrated in FIG. 6, each rod 125 is provided at the end wall 143 at a position above a corresponding ink needle 102 (described later). The rod 125 protrudes frontward from the end wall 143 of the case 101. The rod 125 has a cylindrical shape. The rod 125 is configured to be inserted into an air communication port 96 (described later) in a state where the corresponding ink cartridge 30 is attached to the cartridge-attachment portion 110, that is, in a state where the ink cartridge 30 in an attached position.

<Attachment Sensor 113>

As illustrated in FIG. 6, each attachment sensor 113 is also disposed at the lower surface of the ceiling wall 141 of the case 101. The attachment sensor 113 is configured to detect whether or not the ink cartridge 30 is attached to the cartridge-attachment portion 110. The attachment sensor 113 is disposed at a position frontward of the rod 125 but rearward of the contacts 106. In the present embodiment, the attachment sensor 113 includes a light-emitting portion and a light-receiving portion. The light-emitting portion is positioned rightward or leftward relative to the light-receiving portion so as to be spaced apart therefrom in the left-right direction 9. When the ink cartridge 30 has been attached to the cartridge-attachment portion 110, a light-blocking plate 67 (described later) of the attached ink cartridge 30 is disposed between the light-emitting portion and the light-receiving portion of the attachment sensor 113. In other words, the light-emitting portion and the light-receiving portion are arranged to oppose each other, with the light-blocking plate 67 of the attached ink cartridge 30 interposed between the light-emitting portion and the light-receiving portion.

The attachment sensor 113 is configured to output different detection signals depending on whether or not light emitted from the light-emitting portion in the left-right direction 9 is received by the light-receiving portion. For example, the attachment sensor 113 is configured to output a low-level signal to the controller 130 (see FIG. 12) in case that the light-receiving portion does not receive the light emitted from the light-emitting portion (that is, when an intensity of the light received at the light-receiving portion is less than a predetermined intensity). On the other hand, the attachment sensor 113 is configured to output a high-level signal to the controller 130 (see FIG. 12) in case that the light emitted from the light-emitting portion is received by the light-receiving portion (that is, when the intensity of the received light is equal to or greater than the predetermined intensity).

<Lock Shaft 145>

As illustrated in FIG. 6, the lock shaft 145 extends in the left-right direction 9 at a position in the vicinity of the ceiling wall 141 of the case 101 and in the vicinity of the opening 112. The lock shaft 145 is a bar-like member extending in the left-right direction 9. The lock shaft 145 is, for example, a metal column. The lock shaft 145 has a left end fixed to the side wall 146 of the case 101, and a right end fixed to the side wall 144 of the case 101. The lock shaft 145 extends in the left-right direction 9 over the four spaces of the case 101 in which the four ink cartridges 30 can be respectively accommodated.

The lock shaft 145 is configured to hold each of the ink cartridges 30 attached to the cartridge-attachment portion 110 at the attached position. The ink cartridges 30 are respectively engaged with the lock shaft 145 in a state where the ink cartridges 30 are attached to the cartridge-attachment portion 110. The lock shaft 145 is configured to retain each ink cartridge 30 in the cartridge-attachment portion 110 against urging forces of coil springs 78 and 98 of the ink cartridge 30 that push the ink cartridge 30 frontward.

<Tanks 103>

Figure 7:
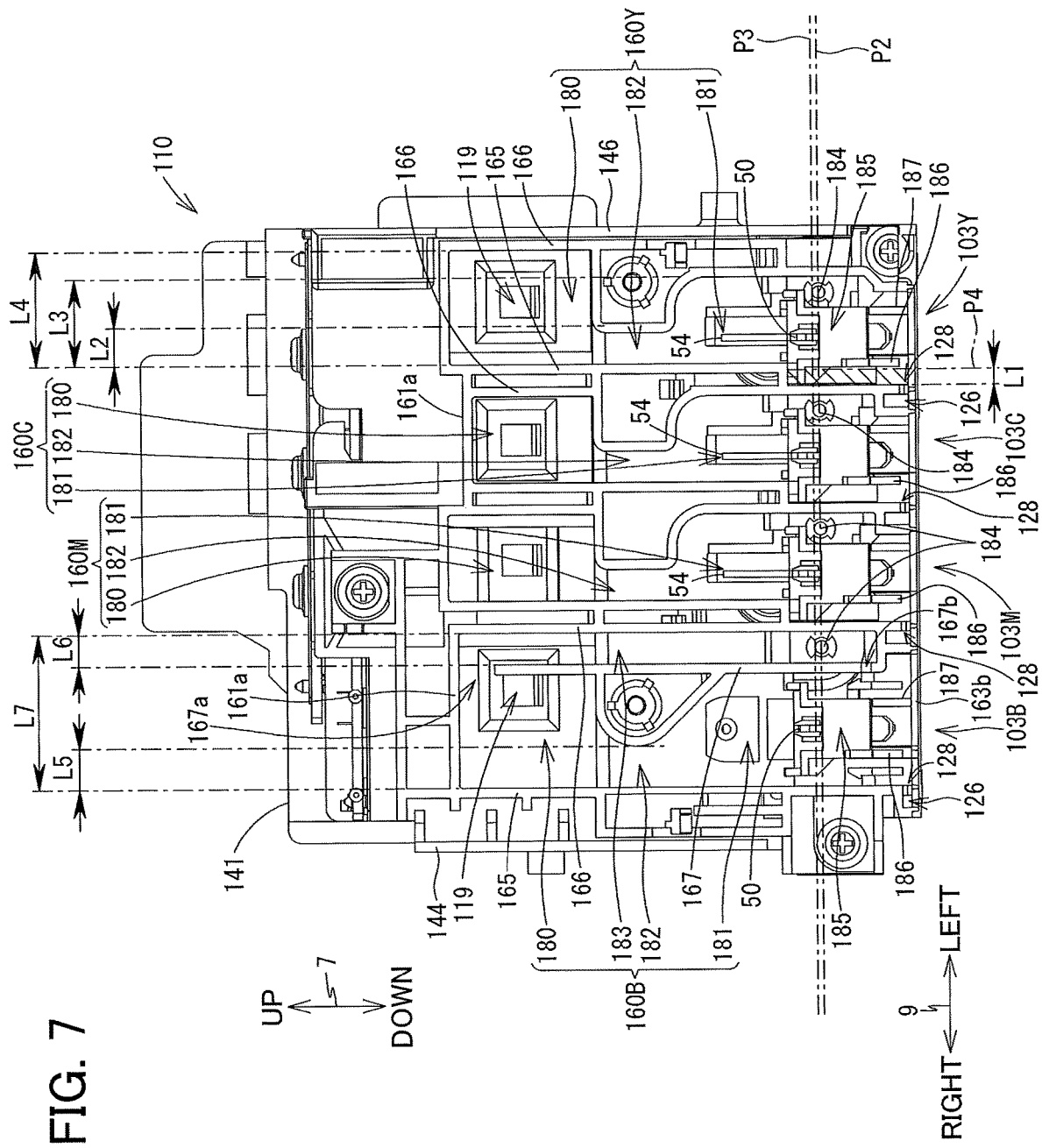
FIG. 7 is a cross-sectional view of the cartridge-attachment portion according to the embodiment taken along a vertical plane VII-VII shown in FIG. 6.

As illustrated in FIGS. 5 and 7, the case 101 includes four tanks 103B, 103M, 103C and 103Y. These four tanks 103B, 103M, 103C and 103Y are arranged to be aligned with one another in the left-right direction 9. The four tanks 103B, 103M, 103C and 103Y correspond to the ink cartridges 30B, 30M, 30C and 30Y, respectively. That is, ink stored in the ink cartridges 30B, 30M, 30C and 30Y is configured to flow into the tanks 103B, 103M, 103C and 103Y, respectively.

As illustrated in FIG. 6, the respective tanks 103 are positioned rearward relative to the corresponding end walls 143 of the case 101. As shown in FIG. 5, each of the tanks 103B, 103M, 103C and 103Y has a generally box shape.

Specifically, as illustrated in FIGS. 5 through 7, each of the tanks 103B, 103M, 103C and 103Y includes a box-shaped tank main body and a connecting portion 107.

As illustrated in FIGS. 5 and 6, each tank main body defines a storage chamber 160 therein.

Each tank main body includes a first upper wall 161a, a second upper wall 161b, a first front wall 162a, a second front wall 162b, a third front wall 162c, a first lower wall 163a, a second lower wall 163b, a rear wall 164, a pair of side walls 165 and 166, and a projecting portion 120 defined by an upper wall 120b and a front wall 120c.

As illustrated in FIG. 6, the first upper wall 161a is positioned upward relative to the second upper wall 161b.

The first front wall 162a is positioned frontward relative to the second front wall 162b. The third front wall 162c is positioned frontward relative to the first front wall 162a.

The first lower wall 163a is positioned upward relative to the second lower wall 163b.

The first front wall 162a extends downward from a front end of the first upper wall 161a. The first lower wall 163a extends rearward from a lower end of the first front wall 162a. The second front wall 162b extends downward from a rear end of the first lower wall 163a. The upper wall 120b extends frontward from a lower end of the second front wall 162b. The front wall 120c extends downward from a front end of the upper wall 120b. The second upper wall 161b extends frontward from a lower end of the upper wall 120b. The third front wall 162c extends downward from a front end of the second upper wall 161b. The second lower wall 163b extends rearward from a lower end of the third front wall 162c.

As illustrated in FIG. 7, the side wall 165 is connected to respective right ends of the upper walls (first and second upper walls 161a and 161b), front walls (first to third front walls 162a, 162b, and 162c), and lower walls (first and second lower walls 163a and 163b) of the corresponding tank 103 (one of the tanks 103B, 103M, 103C and 103Y). Similarly, the side wall 166 is connected to respective left ends of the upper walls (first and second upper walls 161a and 161b), front walls (first to third front walls 162a, 162b, and 162c), and lower walls (first and second lower walls 163a and 163b) of the corresponding tank 103 (one of the tanks 103B, 103M, 103C and 103Y).

The rear wall 164 is a film welded to rear end surfaces of the first upper wall 161a, second lower wall 163b, side wall 165 and side wall 166. In FIG. 5, the rear wall 164 (film) is not illustrated. Note that, while the rear wall 164 is a film in the present embodiment, the walls other than the rear wall 164 may be a film. Alternatively, the rear wall 164 may be a resin wall, instead of a film.

As illustrated in FIG. 6, the connecting portion 107 is adapted to be connected to an ink supply portion 34 of the corresponding ink cartridge 30 attached to the cartridge-attachment portion 110. Upon connection to the ink supply portion 34, the connecting portion 107 is allowed to communicate with a storage chamber 57 storing ink in the ink cartridge 30. The ink stored in the ink cartridge 30 is thus allowed to flow into the storage chamber 160 through the connecting portion 107. That is, the storage chamber 160 is configured to accommodate ink supplied from the ink supply portion 34 connected to the connecting portion 107. Detailed structures of the connecting portion 107 and storage chamber 160 will be described later.

<Connecting Portion 107>

The connecting portion 107 is disposed at each tank 103. Since the connecting portions 107 have the same structures as one another, only one of the connecting portions 107 will be described in detail hereinafter, while descriptions for the remaining three connecting portions 107 will be omitted.

As illustrated in FIG. 4A, the connecting portion 107 includes the ink needle 102 having a hollow configuration, and a guide portion 105.

The ink needle 102 is made of resin and has a generally tubular shape. The ink needle 102 is disposed at a lower end portion of the corresponding end wall 143 of the case 101. Specifically, the ink needle 102 is disposed on the end wall 143 of the case 101 at a position corresponding to the ink supply portion 34 of the ink cartridge 30 attached to the cartridge-attachment portion 110. The ink needle 102 protrudes frontward from the end wall 143 of the case 101.

The guide portion 105 has a cylindrical shape, and is disposed at the end wall 143 to surround the ink needle 102. The guide portion 105 protrudes frontward from the end wall 143 of the case 101. A protruding end (front end) of the guide portion 105 is open. Specifically, the ink needle 102 is positioned at a diametrical center of the guide portion 105. The guide portion 105 is so shaped that the ink supply portion 34 of the attached ink cartridge 30 is received in the guide portion 105.

The connecting portion 107 is not connected to the ink supply portion 34 of the ink cartridge 30 in a state where the ink cartridge 30 is not attached to the cartridge-attachment portion 110. During an insertion process of the ink cartridge 30 into the cartridge-attachment portion 110, i.e., in the course of action for bringing the ink cartridge 30 into an attached position in the cartridge-attachment portion 110 (i.e., a position illustrated in FIG. 6), the ink supply portion 34 of the ink cartridge 30 enters into the guide portion 105. As the ink cartridge 30 is further inserted rearward into the cartridge-attachment portion 110, the ink needle 102 enters into an ink supply port 71 formed in the ink supply portion 34 (see FIG. 6). As a result, the connecting portion 107 is connected to the ink supply portion 34. Hence, ink stored in a storage chamber 33 formed in the ink cartridge 30 is allowed to flow into the corresponding tank 103 through an ink valve chamber 35 formed in the ink supply portion 34 and an internal space 117 defined in the ink needle 102.

Incidentally, the ink needle 102 may have a flat-shaped tip end or a pointed tip end.

As illustrated in FIG. 6, a valve 114 and a coil spring 115 are accommodated in the internal space 117 of the ink needle 102. The valve 114 is movable in the front-rear direction 8 to open and close an opening 116 formed in a protruding tip end portion of the ink needle 102. That is, the valve 114 is configured to open and close the internal space 117 of the ink needle 102. The coil spring 115 urges the valve 114 frontward. Accordingly, the valve 114 closes off the opening 116 in a state where no external force is applied to the valve 114 (i.e., in a state where the ink cartridge 30 is not attached to the cartridge-attachment portion 110). Further, a front end portion of the valve 114 urged by the coil spring 115 protrudes frontward relative to the opening 116 in a state where no external force is applied to the valve 114. In the process of connecting the connecting portion 107 to the ink supply portion 34, the valve 114 opens the opening 116. Details on how the valve 114 opens the opening 116 will be described later.

<Overall Structure of the Storage Chambers 160>

In the present embodiment, the multifunction peripheral 10 includes four storage chambers 160 (160B, 160M, 160C and 160Y) corresponding to the tanks 103C, 103M, 103C and 103Y, respectively.

In the following description, the storage chamber 160 provided in the tank 103B, that is, the storage chamber 160 configured to store black ink, will be referred to as the storage chamber 160B; the storage chamber 160 provided in the tank 103M, that is, the storage chamber 160 configured to store ink of magenta color, will be referred to as the storage chamber 160M; the storage chamber 160 provided in the tank 103C, that is, the storage chamber 160 configured to store ink of cyan color, will be referred to as the storage chamber 160C; and the storage chamber 160 provided in the tank 103Y, that is, the storage chamber 160 configured to store yellow ink, will be referred to as the storage chamber 160Y. Also, the four storage chambers 160B, 160M, 160C and 160Y will be collectively referred to as "storage chambers 160", whenever appropriate.

Referring to FIG. 3, the storage chambers 160 of the cartridge-attachment portion 110 corresponding to the ink cartridges 30B, 30M, 30C, and 30Y are positioned frontward relative to the nozzles 29 of the recording head 21 in the front-rear direction 8. The storage chambers 160 are positioned rightward relative to the conveying path 17 in the left-right direction 9.

The storage chambers 160M, 160C and 160Y have generally the same structures as one another, while the storage chamber 160B has a different structure from the storage chambers 160M, 160C and 160Y. Hence, hereinafter, the structures of the storage chambers 160M, 160C and 160Y will be described first, and the structure of the storage chamber 160B will be described subsequently.

Note that differences in structure among the four storage chambers 160B, 160M, 160C and 160Y may not be limited to those in the present embodiment. For example, the storage chambers 160M, 160C and 160Y may have the same structure as the storage chamber 160B. Alternatively, the storage chamber 160B may have the same structure as the storage chambers 160M, 160C and 160Y. Still alternatively, the storage chamber 160M may have the same structure as the storage chamber 160B, while the storage chambers 160C and 160Y may have a different structure from the storage chamber 160B.

<Storage Chambers 160M, 160C, 160Y>

Since the storage chambers 160M, 160C and 160Y have generally the same structures as one another, hereinafter, the structure of the storage chamber 160Y will be described in detail as an illustrative example while referring to the storage chambers 160M and 160C wherever necessary.

As illustrated in FIGS. 5 through 7, the storage chamber 160Y includes a buffer chamber 180, a first chamber 181 and a second chamber 182.

The buffer chamber 180 is defined by a lower surface of the first upper wall 161a, a rear surface of the first front wall 162a, an upper surface of the first lower wall 163a, a front surface of the rear wall 164, a left surface of the side wall 165 and a right surface of the side wall 166.

The first chamber 181 is defined by a lower surface of the second upper wall 161b, a rear surface of the third front wall 162c, an upper surface of the second lower wall 163b, the front surface of the rear wall 164, the left surface of the side wall 165 and the right surface of the side wall 166.

The second chamber 182 is defined by a rear surface of the second front wall 162b, the front surface of the rear wall 164, the left surface of the side wall 165 and the right surface of the side wall 166.

Referring to FIG. 7, in the storage chamber 160Y, a lower end portion of the left surface of the side wall 165 (a portion defining a right end of a lower portion of the first chamber 181) is positioned rightward relative to a remaining portion of the left surface of the side wall 165 (i.e., a portion defining a right end of an upper portion of the first chamber 181; a portion defining a right end of the second chamber 182; and a portion defining a right end of the buffer chamber 180). That is, the right end of the first chamber 181 of the storage chamber 160Y is positioned rightward relative to the right ends of the buffer chamber 180 and the second chamber 182 of the storage chamber 160Y.

Note that, in the present embodiment, the side wall 165 defining the right end of the storage chamber 160Y has a lower end portion that also constitutes a lower end portion of the side wall 166 defining the left end of the storage chamber 160C, while a remaining portion of the side wall 165 of the storage chamber 160Y (a portion other than the lower end portion) is formed as a separate wall from and a remaining portion of the side wall 166 of the storage chamber 160C (a portion other than the lower end portion). That is, the side wall 165 belonging to the storage chamber 160Y and the side wall 166 belonging to the storage chamber 160C share a portion (lower end portion) partitioning a lower end portion of the tank 103Y from a lower end portion of the tank 103C.

Incidentally, with regard to any neighboring two of the storage chambers 160 (the storage chamber 160Y and storage chamber 160C, for example), the side wall 165 defining the right end of the storage chamber 160 positioned on the left (the storage chamber 160Y) may be provided as a wall independent of the side wall 166 defining the left end of the storage chamber 160 positioned on the right (the storage chamber 160C). Alternatively, the side wall 165 defining the right end of the storage chamber 160 positioned on the left (the storage chamber 160Y) and the side wall 166 defining the left end of the storage chamber 160 positioned on the right (the storage chamber 160C) may be provided as an integral member (wall). Still alternatively, as in the present embodiment, the side wall 165 defining the right end of the storage chamber 160 positioned on the left (the storage chamber 160Y) may have a portion integral with the side wall 166 defining the left end of the storage chamber 160 positioned on the right (the storage chamber 160C).

Specifically, in the storage chamber 160Y, the buffer chamber 180 is positioned above the second chamber 182. The first chamber 181 is positioned below the second chamber 182. An upper end of the second chamber 182 is in communication with the buffer chamber 180. A lower end of the second chamber 182 is in communication with the first chamber 181. That is, the buffer chamber 180 and first chamber 181 are in communication with each other through the second chamber 182.

The upper end of the second chamber 182 is in communication with a right end portion of the buffer chamber 180. The lower end of the second chamber 182 is in communication with a right end portion of the first chamber 181.

Further, referring to FIG. 6, the upper end of the second chamber 182 is in communication with a rear end portion of the buffer chamber 180. The lower end of the second chamber 182 is in communication with a rear end portion of the first chamber 181.

In a state where a stipulated maximum amount of ink is stored in the storage chamber 160Y, a liquid level of the ink is located at a position P1 in the up-down direction 7 (indicated by a chain line in FIG. 6). That is, the stipulated maximum amount of ink provides a liquid level equal to the position P1 in FIG. 6. Incidentally, while the position P1 is a position within the second chamber 182 in the present embodiment, the position P1 may not necessarily be located within the second chamber 182 but may be positioned within the buffer chamber 180, for example.

In the state where the stipulated maximum amount of ink is stored in the storage chamber 160Y, the storage chamber 160Y can be divided into two portions: a lower portion positioned lower than the position P1 ("liquid-storage portion"); and an upper portion positioned higher than the position P1 ("air-communication portion").

The projecting portion 120 is provided above the first chamber 181 and frontward of the second chamber 182. The projecting portion 120 is defined by the upper wall 120b and the front wall 120c. The projecting portion 120 also includes side walls facing rightward and leftward that are made of material capable of transmitting light. The projecting portion 120 defines therein an internal space 120a that is in communication with the first chamber 181 and second chamber 182. The internal space 120a of the projecting portion 120 constitutes a portion of the storage chamber 160Y. Within this internal space 120a of the projecting portion 120, an arm 53 and a detected portion 54 of a pivoting member 50 (described later) are disposed. Note that the projecting portion 120 may be configured to communicate with one of the first chamber 181 and second chamber 182, rather than both of the first chamber 181 and second chamber 182.

In the third front wall 162c, a communication port 184 is formed. The communication port 184 communicates with the first chamber 181. The first chamber 181 is in communication with the internal space 117 of the ink needle 102 via the communication port 184. This structure allows the ink flowing out of the ink cartridge 30Y through the ink needle 102 to flow into the storage chamber 160Y and to be stored therein.

In a state where the liquid level of the ink stored in the storage chamber 160Y is at the same height as the communication port 184 in the up-down direction 7, the buffer chamber 180 and second chamber 182 are positioned higher than the liquid level of the ink stored in the storage chamber 160Y. In the present embodiment, "the liquid level of the ink stored in the storage chamber 160Y is at the same height as the communication port 184" denotes a state where the liquid level is positioned at the same height as an axial center of the ink needle 102 (i.e., a center of the communication port 184) in the up-down direction 7, i.e., at the same height as the center of the ink supply port 71 in the up-down direction 7. More specifically, in the present embodiment, the liquid level is deemed to be "at the same height as the communication port 184" when the liquid level is at a position P2 indicated by another chain line in FIG. 6. Hereinafter, the amount of ink stored in the storage chamber 160 that provides the liquid level corresponding to the position P2 will be referred to as "prescribed amount V2", wherever necessary.

Incidentally, the liquid level may not necessarily be at the position P2 in order to be deemed at the same height as the communication port 184. For example, the liquid level may be considered to be at the same height as the communication port 184 when the liquid level is located at the same height as an upper edge or lower edge of the communication port 184 in the up-down direction 7.

For example, in a state where the liquid level of the ink stored in the storage chamber 160Y is located at the same height as an upper edge of the communication port 184 in the up-down direction 7, the liquid level is at the same height as a position P3 indicated by another chain line in FIG. 6 in the up-down direction 7. In this state, the buffer chamber 180 is positioned upward relative to the liquid level corresponding to the position P3.

As shown in FIG. 7, the storage chamber 160Y is in communication with a corresponding ink passage 126 via a communication port 128. In the present embodiment, the first chamber 181 is in communication with the ink passage 126 through the communication port 128. The communication port 128 is formed in the lower end portion of the side wall 165. The ink passage 126 is a space enclosed by a wall integrally connected to the side wall 165.

Here, the lower end portion of the side wall 165 (the portion defining the right end of the lower portion of the first chamber 181) is positioned rightward relative to the remaining portion of the side wall 165 (i.e., the portion defining: the right end of the upper portion of the first chamber 181; the right end of the second chamber 182; and the right end of the buffer chamber 180). That is, the communication port 128 is formed in the lower end portion of the side wall 165 that defines a portion of the first chamber 181, the portion being positioned rightward relative to the second chamber 182.

Referring to FIG. 6, the communication port 128 is positioned lower than the communication port 184 in the up-down direction 7.

Referring to FIG. 7, the buffer chamber 180 is positioned leftward relative to the communication port 128 in the left-right direction 9.

Further, referring to FIG. 6, the communication port 128 communicates with a front end portion of the first chamber 181. Specifically, the communication port 128 is formed in a front end portion of the side wall 165.

The communication port 128 is positioned frontward relative to the buffer chamber 180 in the front-rear direction 8. That is, the air-communication portion of the storage chamber 160Y (including the buffer chamber 180 and the second chamber 182) is a space positioned rearward relative to the communication port 128 in the front-rear direction 8.

Figure 8:
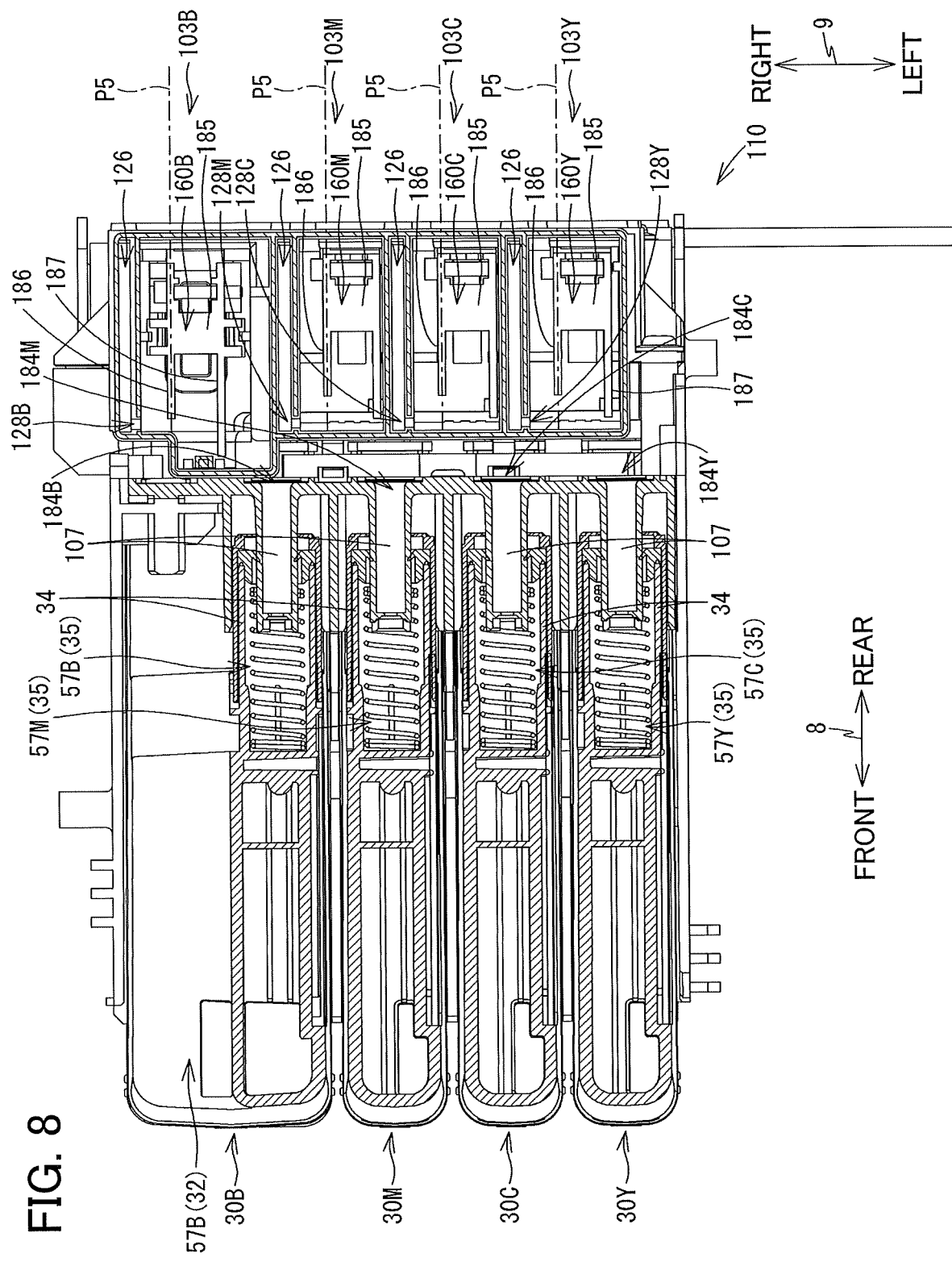
FIG. 8 is a cross-sectional view of the cartridge-attachment portion according to the embodiment taken along a horizontal plane VIII-VIII shown in FIG. 6, illustrating a state where ink cartridges 30Y, 30C, 30M and 30B are attached to the cartridge-attachment portion.

Further, as illustrated in FIG. 8, the communication port 128 of the storage chamber 160Y (communication port 128Y) is positioned rightward relative to the communication port 184 of the storage chamber 160Y (communication port 184Y). Likewise, the communication port 128 of the storage chamber 160C (communication port 128C) is positioned rightward relative to the communication port 184 of the storage chamber 160C (communication port 184C); the communication port 128 of the storage chamber 160M (communication port 128M) is positioned rightward relative to the communication port 184 of the storage chamber 160M (communication port 184M); and the communication port 128 of the storage chamber 160B (communication port 128B) is positioned rightward relative to the communication port 184 of the storage chamber 160B (communication port 184B).

Still further, the communication port 128Y of the storage chamber 160Y is positioned rightward relative to the storage chamber 57 of the ink cartridge 30Y (storage chamber 57Y) that is in communication with the storage chamber 160Y. Likewise, the communication port 128C of the storage chamber 160C is positioned rightward relative to the storage chamber 57 of the ink cartridge 30C (storage chamber 57C) that is in communication with the storage chamber 160C; and the communication port 128M of the storage chamber 160M is positioned rightward relative to the storage chamber 57 of the ink cartridge 30M (storage chamber 57M) that is in communication with the storage chamber 160M. On the other hand, in the present embodiment, the communication port 128B of the storage chamber 160B is positioned leftward relative to a right end of the storage chamber 57 of the ink cartridge 30B (storage chamber 57B) that is in communication with the storage chamber 160B. That is, the communication port 128B is NOT positioned rightward relative to the storage chamber 57B in the embodiment. However, the communication port 128B may be arranged to be positioned rightward relative to the storage chamber 57B.

Also referring to FIG. 8, with respect to any neighboring two of the four tanks 103, the communication port 128 of the tank 103 positioned on the left is positioned rightward relative to a left end of the ink cartridge 30 corresponding to the tank 103 positioned on the right.

More specifically, the communication port 128M of the tank 103M arranged on the left of the tank 103B is positioned rightward relative to the left end of the ink cartridge 30B corresponding to the tank 103B. The communication port 128C of the tank 103C arranged on the left of the tank 103M is positioned rightward relative to the left end of the ink cartridge 30M corresponding to the tank 103M. The communication port 128Y of the tank 103Y arranged on the left of the tank 103C is positioned rightward relative to the left end of the ink cartridge 30C corresponding to the tank 103C.

As also illustrated in FIG. 8, each of the ink passages 126 extends rearward from a position at which the ink passage 126 communicates with the corresponding communication port 128. Each ink passage 126, which extends rearward, then extends upward at a rear end of each tank 103 to be connected to a corresponding ink outlet port 127 (see FIG. 5). Each ink outlet port 127 is connected to corresponding one of the ink tubes 20. With this structure, the ink stored in the storage chamber 160 is allowed to flow out of the storage chamber 160 into the ink passage 126 through the communication port 128, and is supplied to the recording head 21 through the corresponding ink passage 126 and ink tube 20.

The buffer chamber 180 is in communication with corresponding one of two air communication ports 124 (see FIG. 4) disposed upward of the tanks 103. The buffer chamber 180 is in communication with the corresponding air communication port 124 through a through-hole 119 (see FIG. 6) formed in the first front wall 162a. The through-hole 119 is sealed with a semi-permeable membrane 118. An air flow path 147 (see FIG. 5) connects the through-hole 119 of the storage chamber 160Y to the corresponding air communication port 124. The air communication port 124 is configured to be open to the outside so that the storage chamber 160Y is opened to the atmosphere. In other words, the air communication port 124 allows the storage chamber 160Y to communicate with the atmosphere. Note that the air communication port 124 is configured to allow the storage chamber 160Y to communicate with the atmosphere via a different route from that provided by the air communication port 96 of the ink cartridge 30Y.

In the present embodiment, two air flow paths 147 are provided. One of the two air flow paths 147 connects the through-hole 119 of the storage chamber 160B to one of the two air communication ports 124. The other air flow path 147 connects the respective through-holes 119 of the storage chambers 160M, 160C and 160Y to the other one of the air communication ports 124.

Incidentally, the air flow paths 147 may have different structures from that of the embodiment. For example, only one air flow path 147 may be provided, instead of two, such that the sole air flow path 147 may connect each of the through-holes 119 of the storage chambers 160 to a single air communication port 124.

Each through-hole 119 and its corresponding air communication port 124 (see FIG. 4) are positioned rearward relative to the corresponding communication port 128 (see FIG. 6). That is, the air communication ports 124 allow the air-communication portion of each storage chamber 160 (including the buffer chamber 180) to communicate with the atmosphere at a position rearward of the corresponding communication port 128.

As described above, in the depicted embodiment, the communication port 128 is formed at a position corresponding to the lower end, right end and front end of the storage chamber 160. However, the communication port 128 may not necessarily be formed at this position. It is preferable, though, that the communication port 128 be formed at a position: downward relative to the center of the storage chamber 160 in the up-down direction 7; frontward relative to the center of the storage chamber 160 in the front-rear direction 8; and rightward relative to the center of the storage chamber 160 in the left-right direction 9. Further, it is also preferable that the communication port 128 be positioned rightward of the buffer chamber 180.

Here, a portion of the storage chamber 160 that is positioned above the position P2 in the up-down direction 7 and positioned leftward relative to the communication port 128 in the left-right direction 9 will be referred to as a "prescribed space". In the present embodiment, since the communication port 128 constitutes a rightmost end of the storage chamber 160 in the left-right direction 9 (the communication port 128 is formed in the lower end portion of the side wall 165 constituting the right end of the storage chamber 160 to penetrate the same in the left-right direction 9), a portion of the storage chamber 160 that is positioned higher than the position P2 in the up-down direction 7 corresponds to the prescribed space of the storage chamber 160 in the embodiment.

The prescribed space of the storage chamber 160 of the embodiment has a volume larger than a volume of an ink-circulation space between the corresponding communication port 128 and nozzles 29 of the recording head 21. Here, the ink-circulation space is a sum of: a volume of the ink passage 126; a volume of an internal space of the corresponding ink tube 20; and a volume of a space for storing ink within the recording head 21.

Further, in the embodiment, the volume of the prescribed space (i.e., the portion of the storage chamber 160 above the position P2) is smaller than a volume of the stipulated maximum amount of ink that can be stored in the storage chamber 160Y. More specifically, in the storage chamber 160Y, a volume of a portion positioned below the position P1 (see FIG. 6) is larger than the volume of the prescribed space (the portion positioned above the position P2). Note that, in the operable posture, the liquid level of the ink is located at the position P1 in the up-down direction 7 in the state where the stipulated maximum amount of ink is stored in the storage chamber 160Y.

Still further, referring to FIG. 7, in the storage chamber 160Y, the volume of the prescribed space is larger than a volume of a portion indicated by hatching in FIG. 7. This hatched portion is a space of the storage chamber 160Y positioned rightward relative to a position P4 with respect to the left-right direction 9. The position P4 denotes a position separated away from the left surface of the lower end portion of the side wall 165 (in which the communication port 128 is formed) leftward by a distance L1 in the left-right direction 9.

Here, assume that the posture of the multifunction peripheral 10 is changed from its operable posture into such a posture that the left surface of the side wall 165 defines an upper end of the storage chamber 160Y (hereinafter, to be referred to as "left-surface-down posture"). Incidentally, the left-surface-down posture may also be defined as a posture of the multifunction peripheral 10 in which the left surface of the multifunction peripheral 10 in operable posture is placed on a horizontal plane to serve as a bottom surface of the multifunction peripheral 10. In other words, the left surface of the casing 14 of the multifunction peripheral 10 in the operable posture becomes the bottom surface of the casing 14 of the multifunction peripheral 10 in the left-surface-down posture. Accordingly, the vertical direction with respect to the multifunction peripheral 10 in the left-surface-down posture coincides with the left-right direction 9 with respect to the multifunction peripheral 10 in the operable posture.

In accordance with the change in posture of the multifunction peripheral 10 from the operable posture to the left-surface-down posture, the ink that was present near the communication port 128 in the storage chamber 160Y in the operable posture may move downward (i.e., leftward in FIG. 7). That is, as a result of the change in posture from the operable posture to the left-surface-down posture, the ink, which was in contact with the left surface of the lower end portion of the side wall 165 in the operable posture, moves downward (i.e., leftward in FIG. 7) to be separated away from the left surface in the left-surface-down posture. When the liquid surface of the ink in the storage chamber 160 moves downward (i.e., leftward in FIG. 7) to come to a position below the position P4 (i.e., leftward relative to the position P4 in the left-right direction 9 in FIG. 7) in the left-surface-down posture, the liquid surface can no longer be attached to the left surface due to surface tension as the liquid surface is now separated too far away (more than the distance L1) from the left surface of the lower end portion of the side wall 165. That is, the liquid surface of the ink in the storage chamber 160 may no longer be attracted to the left surface of the lower end portion of the side wall 165 due to the surface tension if the liquid surface of the ink in the storage chamber 160Y is separated away from the left surface by the distance L1 or more in the left-surface-down posture of the multifunction peripheral 10.

In other words, the distance L1 can be defined as a minimum distance at least by which the liquid surface should be separated away from the left surface of the lower end portion of the side wall 165, in order to prevent the liquid surface from being attracted to the left surface by the surface tension. Put different way, the surface tension applied to the liquid surface of the ink stored in the storage chamber 160Y may be able to attract the liquid surface to the left surface of the lower end portion of the side wall 165 as long as the liquid surface is located within the hatched region in FIG. 7 with respect to the left-right direction 9 in the left-surface-down posture. Accordingly, in the left-surface-down posture, the ink is less likely to flow out of the storage chamber 160 through the communication port 128 in a case where the liquid surface is separated far away from the left surface by the distance L1 or more (if the liquid surface is located leftward relative to the position P4).

Each of the buffer chamber 180, the first chamber 181 and the second chamber 182 has a generally rectangular shape in cross-section along a horizontal plane.

As illustrated in FIG. 6, the buffer chamber 180 and first chamber 181 extend further frontward relative to the first chamber 181 in the front-rear direction 8. Further, referring to FIG. 7, with respect to the left-right direction 9, a distance L2 between the side wall 165 and side wall 166 in a region defining the second chamber 182 is shorter than a distance L4 between the side wall 165 and side wall 166 in a region defining the buffer chamber 180. The distance L2 is also shorter than a distance L3 between the side wall 165 and side wall 166 in a region defining the first chamber 181. Accordingly, a horizontal cross-sectional area of the buffer chamber 180 is larger than a horizontal cross-sectional area of the second chamber 182. A horizontal cross-sectional area of the first chamber 181 is larger than the horizontal cross-sectional area of the second chamber 182.

<Storage Chamber 160B>

Next, a detailed structure of the storage chamber 160B will be described. In the following description, those parts and components common to those of the storage chambers 160M, 160C and 160Y will be not described to avoid duplicating description.

As illustrated in FIGS. 5 and 7, an inner wall 167 is provided in the storage chamber 160B. The inner wall 167 is a wall extending in the up-down direction 7 and left-right direction 9. The inner wall 167 is disposed between the side walls 165 and 166 in the left-right direction 9. The inner wall 167 has a front end connected to the front walls (first front wall 162a, second front wall 162b and third front wall 162c). The inner wall 167 has a rear end connected to the rear wall 164. That is, the rear wall 164, film, is welded to a rear end surface of the inner wall 167.

Note that, while the inner wall 167 of the embodiment extends vertically upward in the up-down direction 7, the inner wall 167 does not necessarily extend vertically. For example, the inner wall 167 may extend in a direction slanted relative to the up-down direction 7.

The storage chamber 160B includes a third chamber 183, in addition to the three chambers (buffer chamber 180, the first chamber 181 and the second chamber 182) that are also defined in each of the storage chambers 160M, 160C and 160Y. In other words, the storage chamber 160B includes the buffer chamber 180, the first chamber 181, the second chamber 182 and the third chamber 183.

Specifically, the second chamber 182 of the storage chamber 160B is defined by the rear surface of the second front wall 162b, the front surface of the rear wall 164, the left surface of the side wall 165 and a right surface of the inner wall 167.

The third chamber 183 is defined by the rear surface of the second front wall 162b, the front surface of the rear wall 164, a left surface of the inner wall 167 and a right surface of the side wall 166. The third chamber 183 is positioned below the buffer chamber 180 and upward of the first chamber 181. An upper end of the third chamber 183 is in communication with the buffer chamber 180. A lower end of the third chamber 183 is in communication with the first chamber 181.

Specifically, the upper end of the third chamber 183 communicates with a rear end portion of the buffer chamber 180. The lower end of the third chamber 183 communicates with a rear end portion of the first chamber 181. Further, as illustrated in FIG. 7, the upper end of the third chamber 183 is in communication with a left end portion of the buffer chamber 180, while the lower end of the third chamber 183 is in communication with a left end portion of the first chamber 181.

The third chamber 183 is disposed leftward of the second chamber 182. The third chamber 183 is separated from the second chamber 182 by the inner wall 167. That is, the third chamber 183 and the second chamber 182 do not communicate with each other. Put another way, the third chamber 183 connects the buffer chamber 180 to the first chamber 181 at a position leftward of the second chamber 182.

That is, the inner wall 167 partitions an internal space of the storage chamber 160B in the left-right direction 9. In the storage chamber 160B, the pivoting member 50 (described later) is disposed rightward of the inner wall 167. The storage chamber 160B is in communication with the connecting portion 107 via the communication port 184 at a position leftward of the inner wall 167. That is, the inner wall 167 partitions a space between the connecting portion 107 and the pivoting member 50 in the left-right direction 9 within the storage chamber 160B.

The inner wall 167 extends between upper and lower portions of the storage chamber 160B. That is, the inner wall 167 spans between the buffer chamber 180 and the first chamber 181 in the up-down direction 7. With the inner wall 167, the buffer chamber 180 is divided into two spaces in the left-right direction 9, and the first chamber 181 is also divided into two spaces in the left-right direction 9.

The inner wall 167 has an upper end that defines a gap 167a relative to the first upper wall 161a. The two spaces in the buffer chamber 180 separated by the inner wall 167 are allowed to communicate with each other through the gap 167a. Likewise, the inner wall 167 has a lower end that is formed with a notch 167b. The two spaces in the first chamber 181 separated by the inner wall 167 are allowed to communicate with each other through the notch 167b.

Incidentally, the inner wall 167 does not necessarily extend to span between the upper and lower end portions of the storage chamber 160B, provided that the inner wall 167 spans from a position upward relative to the communication port 184 and the detected portion 54 to a position downward relative to the communication port 184 and the detected portion 54. For example, the upper end of the inner wall 167 may extend up to a position lower than the position shown in FIG. 7.

As illustrated in FIG. 7, the communication port 128 of the storage chamber 160B is formed at a position rightward relative to the inner wall 167 and downward relative to the notch 167b in the present embodiment. Alternatively, the communication port 128 may be provided leftward relative to the inner wall 167 in the storage chamber 160B. Still alternatively, the communication port 128 may be provided at the same height as the notch 167b in the up-down direction 7. Still alternatively, the communication port 128 may be provided upward relative to the notch 167b. Incidentally, instead of the notch 167b, a through-hole may be formed in the lower end portion of the inner wall 167 for allowing communication between the two spaces in the first chamber 181.

The third chamber 183 has a cross-section of a generally rectangular shape along a horizontal plane. The buffer chamber 180 and first chamber 181 extend further frontward relative to the third chamber 183 in the front-rear direction 8. Further, referring to FIG. 7, a sum of a distance L5 and a distance L6 is shorter than a distance L7 with respect to the left-right direction 9. Here, the distance L5 is a distance between the side wall 165 and the inner wall 167 in a region defining the second chamber 182; the distance L6 is a distance between the inner wall 167 and side wall 166 in a region defining the third chamber 183; and the distance L7 is a distance between the side wall 165 and side wall 166 in regions defining the buffer chamber 180 and first chamber 181, respectively. Accordingly, a horizontal cross-sectional area of the buffer chamber 180 is larger than a sum of a horizontal cross-sectional area of the second chamber 182 and a horizontal cross-sectional area of the third chamber 183. Further, a horizontal cross-sectional area of the first chamber 181 is larger than the sum of the horizontal cross-sectional area of the second chamber 182 and the horizontal cross-sectional area of the third chamber 183.

<Pivoting Member 50>

As illustrated in FIG. 6, the pivoting member 50 is disposed in the storage chamber 160 of each tank 103. The pivoting member 50 is supported by a support member 185 provided in each storage chamber 160 so as to be pivotally movable in directions of arrows 58 and 59.

The pivoting member 50 may be supported by a structure other than the support member 185. For example, the pivoting member 50 may be supported by a wall of the case 101 defining the storage chamber 160. In this case, the support member 185 may not be disposed within the storage chamber 160.

Figure 9A:
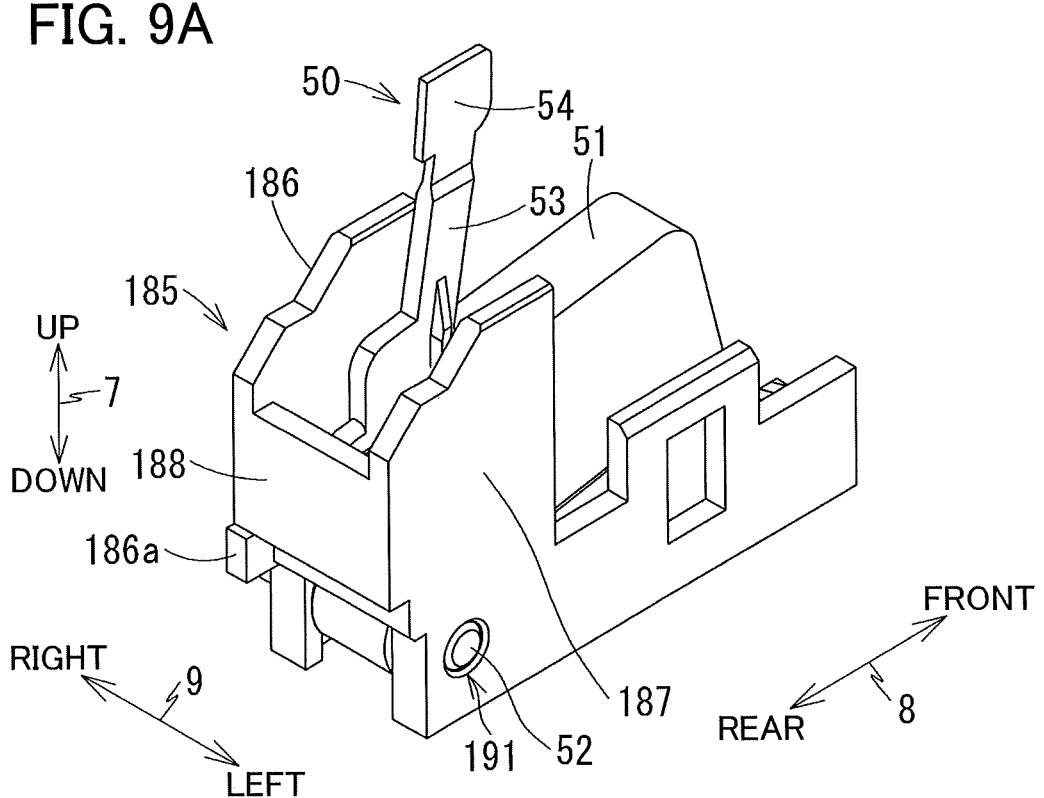
FIG. 9A is a perspective view of a pivot member and a support member provided in the cartridge-attachment portion according to the embodiment.
Figure 9B:
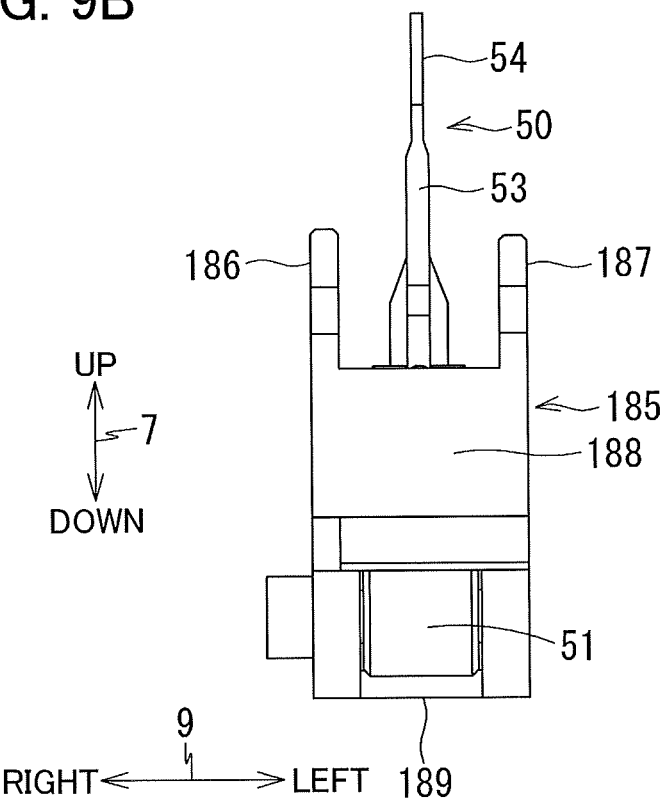
FIG. 9B is a rear side view of the pivot member and the support member provided in the cartridge-attachment portion according to the embodiment.

As illustrated in FIGS. 8, 9A and 9B, the support member 185 includes a right side wall 186 and a left side wall 187, a rear wall 188 and a bottom wall 189. The right side wall 186 and left side wall 187 are arranged to oppose each other in the left-right direction 9. The right side wall 186 and left side wall 187 extend in the up-down direction 7 and front-rear direction 8. The rear wall 188 connects respective rear ends of the right side wall 186 and left side wall 187. The bottom wall 189 connects respective bottom ends of the right side wall 186 and left side wall 187. The right side wall 186 has a rear end at which a protrusion 186a is provided. As shown in FIG. 5, the protrusion 186a is adapted to be fitted in a recessed portion 190 formed at the second lower wall 163b defining the storage chamber 160 of each tank 103. The recessed portion 190 is configured of a pair of protrusions provided at the second lower wall 163b. The support member 185 is thus fixed in position within and relative to the storage chamber 160 of each tank 103.

As illustrated in FIGS. 7 and 8, the right side wall 186 is positioned leftward relative to the corresponding communication port 128. Further, as illustrated in FIG. 7, the right side wall 186 is positioned between the left and right ends of the second chamber 182 in the left-right direction 9. That is, the second chamber 182 has a portion whose left-right position is coincident with the left-right position of an entirety of the right side wall 186. Put different way, the right side wall 186 is aligned with the second chamber 182 in the up-down direction 7.

Incidentally, only a portion of the right side wall 186 may be aligned with the second chamber 182 in the up-down direction 7. That is, the second chamber 182 may have a portion whose left-right position is coincident with only a portion of the right side wall 186. Still alternatively, the second chamber 182 may not have any portion whose left-right position is coincident with the left-right position of the right side wall 186. That is, the right side wall 186 may not be aligned with the second chamber 182 (i.e., the right side wall 186 may be arranged offset from the second chamber 182) in the up-down direction 7.

As illustrated in FIG. 8, the right side wall 186 is positioned rearward relative to the communication port 128 in the front-rear direction 8. Further, as illustrated in FIG. 7, the right side wall 186 is positioned higher relative to the corresponding communication port 128. In other words, the right side wall 186 is not aligned with (offset from) the communication port 128 in the up-down direction 7; and the right side wall 186 is not aligned with (offset from) the communication port 128 in the front-rear direction 8.

As illustrated in FIG. 6, an upper end of the right side wall 186 is positioned below the second upper wall 161b. That is, there is a gap defined between the upper end of the right side wall 186 and a lower surface of the second upper wall 161b that defines an upper end of the first chamber 181.

As described earlier, in the operable posture of the multifunction peripheral 10, the liquid level of the ink is located at the position P1 in the state where the stipulated maximum amount of ink is stored in the storage chamber 160. If the posture of the multifunction peripheral 10 is changed into the left-surface-down posture from the operable posture with the stipulated maximum amount of ink stored in the storage chamber 160, the liquid level of the ink in each tank 103 comes to a height equal to a position P5 shown in FIG. 8. In this state (left-surface-down posture), the right side wall 186 is generally at the same position as the position P5 in the left-right direction 9. Incidentally, while the right side wall 186 may be at a position different from the position P5 in the left-right direction 9, the right side wall 186 may be preferably arranged in the vicinity of the position P5.

As shown in FIGS. 9A and 9B, the pivoting member 50 is arranged between the right side wall 186 and left side wall 187 of the support member 185. As illustrated in FIGS. 6, 9A and 9B, the pivoting member 50 includes a float 51, a shaft 52, the arm 53, and the detected portion 54.

The float 51 constitutes a lower portion of the pivoting member 50. The float 51 is made of a material having a specific gravity smaller than a specific gravity of the ink stored in the storage chamber 160. The shaft 52 protrudes from left and right surfaces of the float 51 in the left-right direction 9. Protruding ends of the shaft 52 are inserted into holes 191 each formed in the right side wall 186 or the left side wall 187 of the support member 185. With this configuration, the pivoting member 50 is supported by the support member 185 so as to be pivotally movable about an axis of the shaft 52. The shaft 52 is positioned downward relative to the communication port 184 of the corresponding connecting portion 107 (see FIG. 6). The float 51 and shaft 52 are located within the first chamber 181 of each storage chamber 160.

The arm 53 protrudes substantially upward from the float 51. The detected portion 54 is provided at a protruding tip end portion of the arm 53. That is, the detected portion 54 constitutes a pivoting end portion of the pivoting member 50. A portion of the arm 53 and the detected portion 54 are located in the internal space 120a of the projecting portion 120.

The detected portion 54 is positioned upward relative to the communication port 184. The detected portion 54 has a plate shape extending in the up-down direction 7 and the front-rear direction 8. The detected portion 54 is made of material that can block light emitted from a light-emitting portion of the corresponding liquid-level sensor 55 (described later).

While the liquid level of the ink stored in the storage chamber 160 is higher than the position P2 (more specifically, the center of the communication port 184) in the up-down direction 7, in other words, while the liquid level of the ink stored in the storage chamber 57 of the ink cartridge 30 is higher than the position P2 of the ink supply portion 34 (more specifically, the center of the ink supply port 71) in the up-down direction 7, the pivoting member 50 pivotally moves in the direction of the arrow 58 due to buoyancy acting on the float 51. As a result, the pivoting member 50 is positioned at a detection position indicated by a solid line in FIG. 6.

As the ink stored in the storage chamber 160 and in the ink valve chamber 35 is consumed and the liquid level of the ink stored in the storage chamber 57 is lowered to a height equal to the position P2 in the up-down direction 7, the pivoting member 50 pivotally moves in the direction of the arrow 59 following the liquid level (liquid surface) of the ink stored in the storage chamber 160. As a result, the pivoting member 50 moves to a non-detection position indicated by a broken line in FIG. 6. That is, the pivoting member 50 is configured to change its posture (pivot) depending on whether the liquid level of the ink stored in the storage chamber 160 is at the same position (at the same height) as the communication port 184 in the up-down direction 7.

In the present embodiment, the pivoting member 50 is configured to pivot to move from the detection position to the non-detection position when the liquid level of the ink stored in the storage chamber 160 reaches the position P2 in the up-down direction 7. However, instead, the pivoting member 50 may be configured to pivot when the liquid level of the ink reaches a prescribed position (height) lower than the position P2.

<Liquid-Level Sensor 55>

The liquid-level sensor 55 (see FIGS. 6 and 12) is provided to detect the change in posture of the corresponding pivoting member 50 including the detected portion 54. In the present embodiment, each liquid-level sensor 55 includes the light-emitting portion and a light-receiving portion both mounted on a substrate 60. The light-emitting portion and the light-receiving portion of the liquid-level sensor 55 are arranged spaced apart from each other in the left-right direction 9, with the projecting portion 120 of the corresponding tank 103 interposed between the light-emitting portion and the light-receiving portion. The light-emitting portion of the liquid-level sensor 55 is disposed rightward or leftward relative to the projecting portion 120, while the light-receiving portion of the liquid-level sensor 55 is disposed at the other side of the light-emitting portion relative to the projecting portion 120. A path of light outputted from the light-emitting portion of the liquid-level sensor 55 coincides with the left-right direction 9. When the pivoting member 50 is at the detection position, the detected portion 54 of the pivoting member 50 is positioned between the light-emitting portion and the light-receiving portion of the liquid-level sensor 55.

The liquid-level sensor 55 is configured to output detection different signals depending on whether or not the light outputted from the light-emitting portion is received by the light-receiving portion. For example, the liquid-level sensor 55 is configured to output a low-level signal (a signal whose signal level is lower than a threshold level) to the controller 130 (see FIG. 12) in case that the light-receiving portion does not receive the light outputted from the light-emitting portion (that is, an intensity of the light received at the light-receiving portion is less than a predetermined intensity). On the other hand, the liquid-level sensor 55 is configured to output a high-level signal (a signal whose signal level is equal to or higher than the threshold level) to the controller 130 in case that the light-receiving portion receives the light outputted from the light-emitting portion (that is, the intensity of the light received at the light-receiving portion is equal to or higher than the predetermined intensity).

The detected portion 54 is positioned between the light-emitting portion and the light-receiving portion of the corresponding liquid-level sensor 55 when the pivoting member 50 is at the detection position. Thus, in case that the liquid level of the ink stored in the storage chamber 160 of the tank 103 (in other words, the liquid level of the ink stored in the storage chamber 57 of the ink cartridge 30) is higher than the position P2 in the up-down direction 7, the liquid-level sensor 55 outputs the low-level signal to the controller 130 since the light-receiving portion does not receive the light outputted from the light-emitting portion.

On the other hand, when the pivoting member 50 is at the non-detection position, the detected portion 54 is retracted from the position between the light-emitting portion and the light-receiving portion of the liquid-level sensor 55. Thus, in case that the liquid level of the ink stored in the storage chamber 160 of the tank 103 (in other words, the liquid level of the ink stored in the storage chamber 57 of the ink cartridge 30) is equal to or lower than the position P2 in the up-down direction 7, the light-receiving portion receives the light outputted from the light-emitting portion. Accordingly, the liquid-level sensor 55 outputs the high-level signal to the controller 130.

[Ink Cartridge 30]

Figure 10:
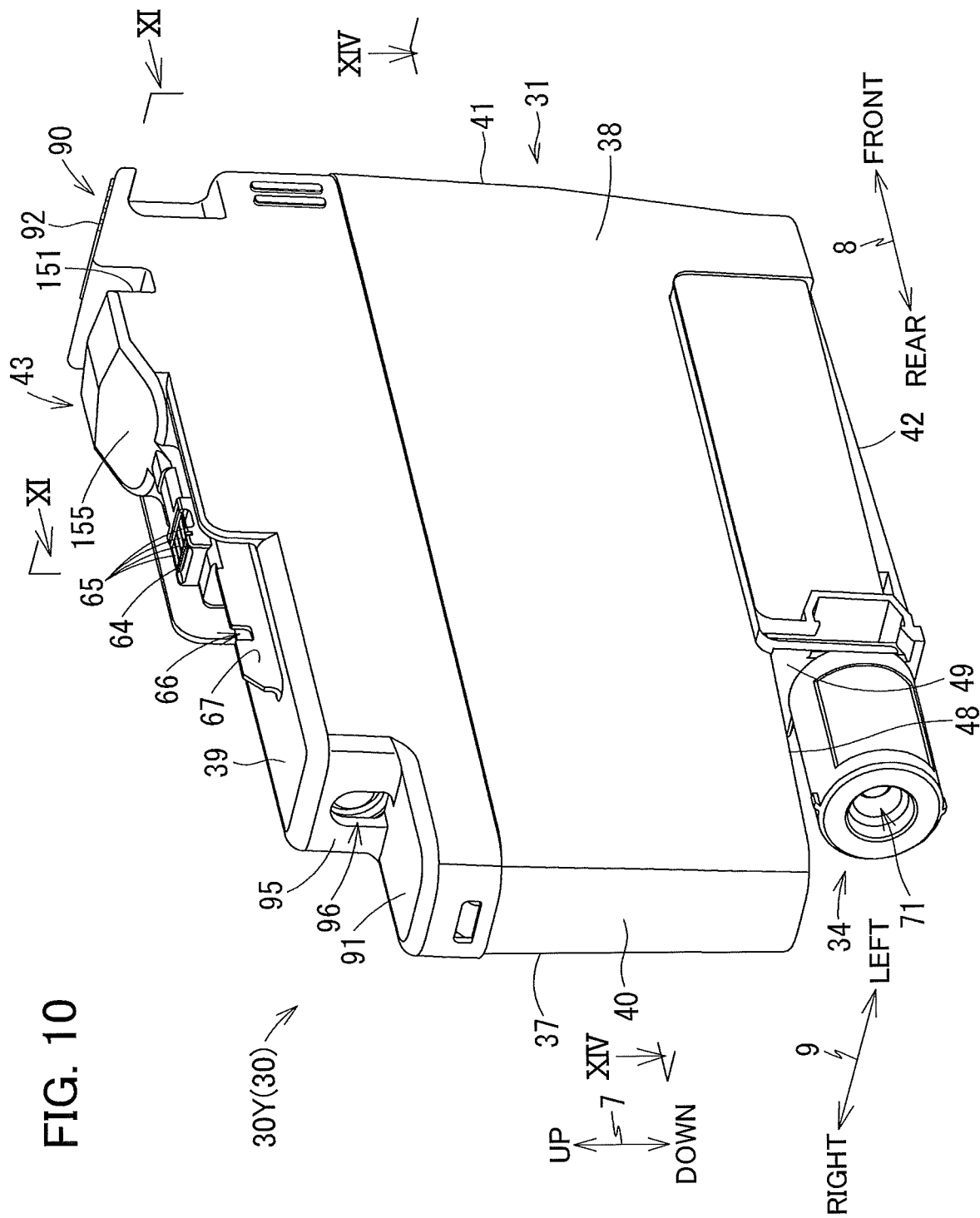
FIG. 10 is a front perspective view of the ink cartridge attachable to the cartridge-attachment portion according to the embodiment.

The ink cartridge 30 illustrated in FIGS. 6 and 10 is a container for storing ink therein. The posture of the ink cartridge 30 illustrated in FIGS. 6 and 10 is the operable posture of the ink cartridge 30, that is, the posture of the ink cartridge 30 when the ink cartridge 30 is capable of being used in the multifunction peripheral 10.

The ink cartridge 30 depicted in FIG. 10 is the ink cartridge 30Y storing ink of yellow color. The ink cartridges 30C and 30M storing ink of cyan and magenta color, respectively, have substantially the same structures as the ink cartridge 30Y, except presence or absence of a cutout 66 and/or position of the cutout 66. The ink cartridge 30B storing black is different from the ink cartridges 30Y, 30C and 30M in that the ink cartridge 30B has a larger dimension than the ink cartridges 30Y, 30C and 30M in the left-right direction 9. Other than the larger left-right dimension, the ink cartridge 30B has substantially the same structure as the ink cartridges 30Y, 30C and 30M, except presence or absence of the cutout 66 and/or position of the cutout 66. Hereinafter, details of the ink cartridge 30Y storing yellow ink will be described as an illustrative example, while descriptions for the ink cartridges 30B, 30C and 30M will be omitted to simplify description.

As illustrated in FIGS. 6 and 10, the ink cartridge 30(30Y) includes a cartridge casing 31 that is substantially rectangular parallelepiped. The cartridge casing 31 includes a rear wall 40, a step wall 49, a step wall 95, a front wall 41, a top wall 39, a sub-top wall 91, a bottom wall 42, a sub-bottom wall 48, a right side wall 37, and a left side wall 38.

The cartridge casing 31 as a whole has a generally flattened shape so that a dimension of the cartridge casing 31 in the left-right direction 9 is small, and a dimension of the cartridge casing 31 in the up-down direction 7 and a dimension of the cartridge casing 31 in the front-rear direction 8 are greater than the dimension of the cartridge casing 31 in the left-right direction 9. At least the front wall 41 of the cartridge casing 31 has light transmission capability so that the liquid level of the ink stored in a storage chamber 32 (described later) and the storage chamber 33 can be visually recognized from an outside of the cartridge casing 31.

The sub-bottom wall 48 is positioned upward relative to the bottom wall 42 and extends frontward continuously from a lower end of the rear wall 40. In the present embodiment, a rear end of the sub-bottom wall 48 is positioned rearward relative to a rear end of the ink supply portion 34, while a front end of the sub-bottom wall 48 is positioned frontward relative to the rear end of the ink supply portion 34. The step wall 49 connects the bottom wall 42 to the sub-bottom wall 48. The ink supply portion 34 extends rearward from the step wall 49 at a position downward relative to the sub-bottom wall 48 and upward relative to the bottom wall 42. Incidentally, the rear end of the sub-bottom wall 48 may be positioned at an arbitrary position. For example, the rear end of the sub-bottom wall 48 may be positioned frontward relative to the rear end of the ink supply portion 34.

A protruding portion 43 is provided at an outer surface of the top wall 39 to protrude upward therefrom. The protruding portion 43 extends in the front-rear direction 8. The protruding portion 43 has a lock surface 151 facing frontward. The lock surface 151 is positioned upward relative to the top wall 39. The lock surface 151 is configured to contact the lock shaft 145 in a state where the ink cartridge 30 is attached to the cartridge-attachment portion 110. The lock surface 151 comes into contact with the lock shaft 145 while pushing the lock shaft 145 frontward, so that the ink cartridge 30 is held in the cartridge-attachment portion 110 against the urging forces of the coil springs 78 and 98.

The protruding portion 43 also has an inclined surface 155. The inclined surface 155 is positioned rearward relative to the lock surface 151. During an attachment process of the ink cartridge 30 to the cartridge-attachment portion 110, the lock shaft 145 is guided by the inclined surface 155. As the lock shaft 145 moves along the inclined surface 155, the lock shaft 145 is guided to a position capable of contacting the lock surface 151.

An operation portion 90 is disposed frontward relative to the lock surface 151 on the top wall 39. The operation portion 90 has an operation surface 92. When the operation surface 92 is pushed downward in a state where the ink cartridge 30 is attached to the cartridge-attachment portion 110, the ink cartridge 30 is pivotally moved, thereby moving the lock surface 151 downward. As a result, the lock surface 151 is positioned further downward relative to the lock shaft 145. In this way, the ink cartridge 30 can be extracted from the cartridge-attachment portion 110.

The light-blocking plate 67 is provided at the outer surface of the top wall 39 to protrude upward therefrom. The light-blocking plate 67 extends in the front-rear direction 8. The light-blocking plate 67 is disposed rearward relative to the protruding portion 43.

The light-blocking plate 67 is arranged to be located between the light-emitting portion and the light-receiving portion of the attachment sensor 113 in a state where the ink cartridge 30 is attached to the cartridge-attachment portion 110. Hence, the light-blocking plate 67 is configured to block the light of the attachment sensor 113 traveling in the left-right direction 9.

More specifically, when the light emitted from the light-emitting portion of the attachment sensor 113 is incident on the light-blocking plate 67 before the light arrives at the light-receiving portion of the attachment sensor 113, an intensity of the light received by the light-receiving portion is less than a predetermined intensity, for example, zero. Note that the light-blocking plate 67 may completely block the light traveling from the light-emitting portion to the light-receiving portion, or may partially attenuate the light. Alternatively, the light-blocking plate 67 may refract the light to change a traveling direction thereof, or may fully reflect the light.

In the present embodiment, a notch 66 is formed in the light-blocking plate 67. The notch 66 is a space that is recessed downward from an upper edge of the light-blocking plate 67, and extends in the front-rear direction 8. Since the notch 66 is formed in the light-blocking plate 67 at a position opposing the attachment sensor 113 in a state where the ink cartridge 30 is attached to the cartridge-attachment portion 110, the light emitted from the light-emitting portion of the attachment sensor 113 passes through the notch 66 and is therefore not blocked by the light-blocking plate 67. Accordingly, the light emitted from the light-emitting portion of the attachment sensor 113 reaches the light-receiving portion of the attachment sensor 113. On the other hand, in case that the notch 66 is not formed in the light-blocking plate 67, the light-blocking plate 67 opposes the light-emitting portion of the attachment sensor 113 in a state where the ink cartridge 30 is attached to the cartridge-attachment portion 110. Accordingly, the light emitted from the light-emitting portion of the attachment sensor 113 does not reach the light-receiving portion of the attachment sensor 113. With this structure, types of the ink cartridges 30, such as types of ink stored in the ink cartridges 30, and initial amounts of ink stored in the ink cartridges 30, can be determined based on whether or not the notch 66 is formed in the light-blocking plate 67 of the ink cartridge 30 attached to the cartridge-attachment portion 110.

An IC board 64 is also provided at the outer surface of the top wall 39. The IC board 64 is positioned between the light-blocking plate 67 and the protruding portion 43 in the front-rear direction 8. The IC board 64 is electrically connected to the corresponding set of four contacts 106 in a state where the ink cartridge 30 is attached to the cartridge-attachment portion 110.

The IC board 64 includes a substrate made of silicon for example, an IC (not illustrated), and four electrodes 65. The IC and the four electrodes 65 are mounted on the substrate. The four electrodes 65 are arrayed in the left-right direction 9. The IC is a semiconductor integrated circuit. The IC readably stores data indicative of information on the ink cartridge 30, such as a lot number, a manufacturing date, a color of ink, and the like. Alternatively, the IC board 64 may be configured by providing the IC and electrodes on a flexible substrate having flexibility.

Each of the four electrodes 65 is electrically connected to the IC. Each of the four electrodes 65 extends in the front-rear direction 8. The electrodes 65 are arranged spaced apart from one another in the left-right direction 9. Each electrode 65 is provided on an upper surface of the IC board 64 and exposed thereon to an outside to allow electrical access to the electrode 65.

The step wall 95 extends upward from a front end of the sub-top wall 91 that is positioned rearward relative to the top wall 39. The step wall 95 is formed with the air communication port 96 to allow the storage chamber 32 to communicate with the atmosphere. In other words, the air communication port 96 is positioned higher relative to the center of the cartridge casing 31 in the up-down direction 7. The air communication port 96 is a substantially circular-shaped opening formed in the step wall 95. The air communication port 96 has an inner diameter that is greater than an outer diameter of the rod 125 of the cartridge-attachment portion 110.

In the attachment process of the ink cartridge 30 into the cartridge-attachment portion 110, the rod 125 enters an air valve chamber 36 (described later) through the air communication port 96. As the rod 125 passes through the air communication port 96, the rod 125 moves a valve 97 configured to seal the air communication port 96 frontward against the urging force of the coil spring 98. As the valve 97 is moved frontward to be separated from the air communication port 96, the storage chamber 32 is open to the atmosphere.

Incidentally, a member for sealing the air communication port 96 should not necessarily be the valve 97. For example, a peel-off seal may be provided at the step wall 95 to seal the air communication port 96.

As illustrated in FIG. 6, the storage chamber 57, an air flow path 61 and an ink buffer chamber 62 are provided within the cartridge casing 31. The storage chamber 57 includes the storage chamber 32, the storage chamber 33, and the ink valve chamber 35. The storage chamber 32 and storage chamber 33 are configured to store ink therein.

Inside the cartridge casing 31, a partition wall 44 and an inner bottom wall 45 are provided. The partition wall 44 and inner bottom wall 45 both extend in the front-rear direction 8 and left-right direction 9. The partition wall 44 and inner bottom wall 45 are arranged to oppose each other in the up-down direction 7.

The storage chamber 32 is a space defined by: a lower surface of the partition wall 44; upper surfaces of the inner bottom wall 45 and sub-bottom wall 48; inner surfaces of the front wall 41, rear wall 40 and step wall 49; and inner surfaces of the right side wall 37 and left side wall 38. Specifically, the lower surface of the partition wall 44 defines an upper edge of the storage chamber 32; the upper surfaces of the inner bottom wall 45 and sub-bottom wall 48 define a lower edge of the storage chamber 32; the inner surfaces of the front wall 41 define a front edge of the storage chamber 32; the inner surfaces of the rear wall 40 and step wall 49 define a rear edge of the storage chamber 32; and the inner surfaces of the right side wall 37 and left side wall 38 define a right edge and a left edge of the storage chamber 32, respectively.

The partition wall 44 separates the storage chamber 32 from the air flow path 61. The partition wall 44 has a front end portion that is formed with a through-hole 46. The storage chamber 32 and the air flow path 61 are in communication with each other through the through-hole 46.

The inner bottom wall 45 extends frontward from the inner surface of the step wall 49. The inner bottom wall 45 partitions the storage chamber 57 into the storage chamber 32 (above the inner bottom wall 45) and the storage chamber 33 (below the inner bottom wall 45). The inner bottom wall 45 has a front end portion in which a gap 45a is formed (see FIGS. 13, 14A and 14B). The storage chamber 32 and the storage chamber 33 are in communication with each other through the gap 45a.

Figure 13:
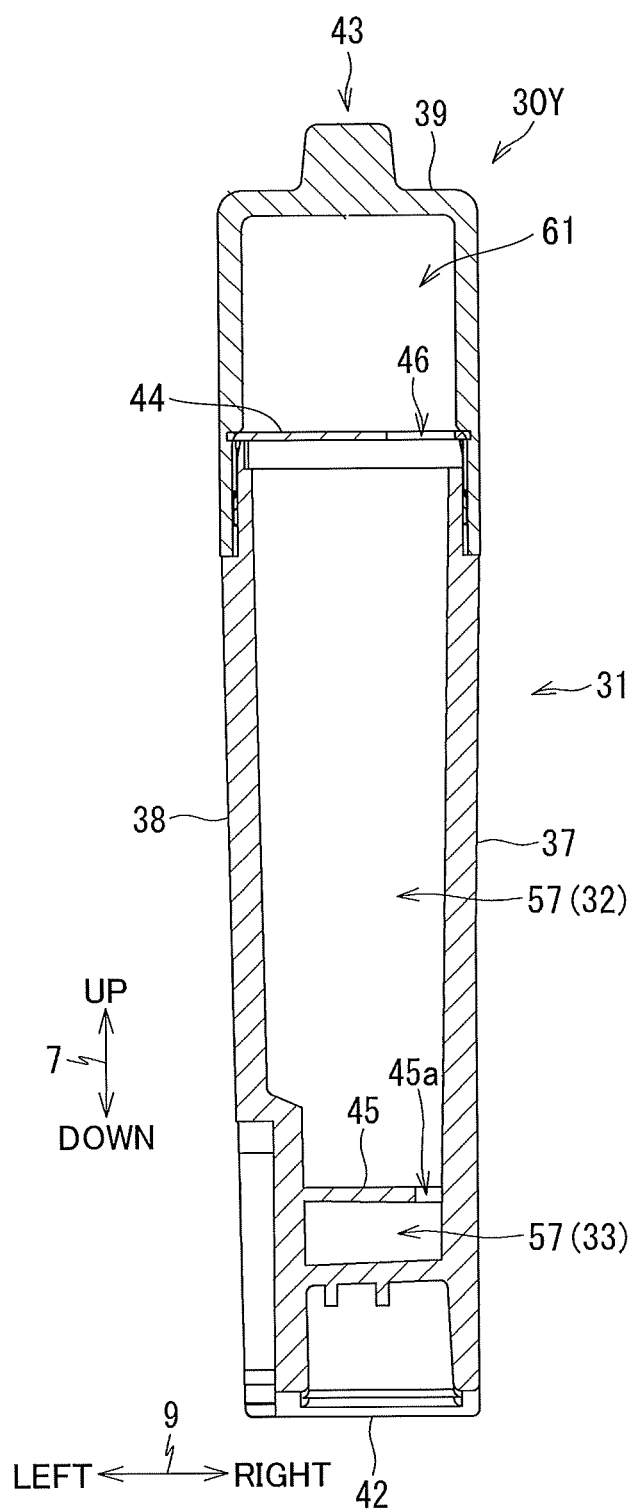
FIG. 13 is a cross-sectional view of the ink cartridge according to the embodiment taken along a vertical plane XI-XI shown in FIG. 10.
Figure 14A:
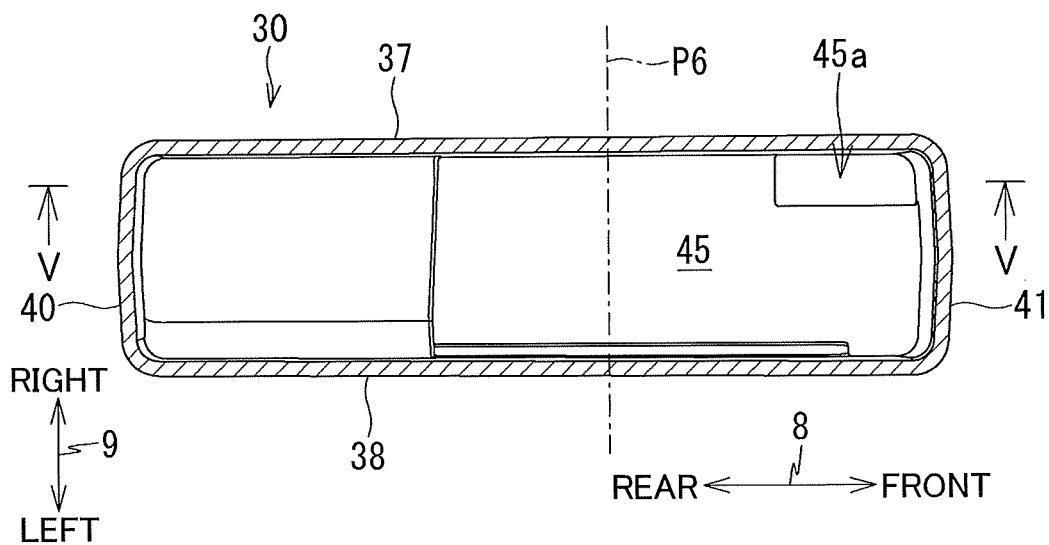
FIG. 14A is a cross-sectional view of the ink cartridge according to the embodiment taken along a horizontal plane XIV-XIV shown in FIG. 10.

As illustrated in FIGS. 13 and 14A, a left end of the inner bottom wall 45 is connected to the left side wall 38. That is, the inner bottom wall 45 extends rightward from an inner surface of the left side wall 38, i.e., from a surface facing rightward and defining the storage chamber 32. With respect to the left-right direction 9, the gap 45a is formed in a right end portion of the inner bottom wall 45. As illustrated in FIG. 13, a left edge of the gap 45a is positioned rightward relative to a left edge of the through-hole 46 in the left-right direction 9.

Note that the through-hole 46 may be positioned leftward relative to the gap 45a. Specifically, a right edge of the through-hole 46 may be positioned leftward relative to the left edge of the gap 45a.

As illustrated in FIG. 6, the inner bottom wall 45 is positioned upward relative to the ink supply port 71 of the ink supply portion 34.

The storage chamber 33 is located below the storage chamber 32 inside the cartridge casing 31 in the operable posture of the ink cartridge 30. The storage chamber 33 has a volume (a maximum amount of ink that the storage chamber 33 can store therein) that is smaller than a volume of the storage chamber 32 (a maximum amount of ink that the storage chamber 32 can store therein).

A lower surface of the inner bottom wall 45 defines an upper edge of the storage chamber 33. An upper surface of the bottom wall 42 defines a lower edge of the storage chamber 33. The inner surface of the front wall 41 defines a rear edge of the storage chamber 33. The inner surfaces of the right side wall 37 and left side wall 38 define a right edge and a left edge of the storage chamber 33, respectively. A partitioning wall 47 is also formed inside the cartridge casing 31 to separate the storage chamber 33 from the ink valve chamber 35 in the front-rear direction 8. A front surface of the partitioning wall 47 defines a rear edge of the storage chamber 33. The partitioning wall 47 is formed with a through-hole 99.

In other words, the storage chamber 33 is a space defined by the lower surface of the inner bottom wall 45, the upper surface of the bottom wall 42, the inner surface of the front wall 41, the inner surfaces of the right side wall 37 and left side wall 38 and the front surface of the partitioning wall 47. The storage chamber 33 is in communication with the ink valve chamber 35 through the through-hole 99.

The air flow path 61 is configured to allow the storage chamber 57 to communicate with the atmosphere. The air flow path 61 has one end portion (front end portion) in communication with the storage chamber 32 via the through-hole 46, and another end portion (rear end portion) in communication with the atmosphere via the air communication port 96.

The air valve chamber 36 constitutes the other end portion (rear end portion) of the air flow path 61. Within the air valve chamber 36, the valve 97 and the coil spring 98 are accommodated. The air valve chamber 36 is in communication with the outside through the air communication port 96. The valve 97 is movable between a closed position and an open position. At the closed position, the valve 97 seals the air communication port 96. At the open position, the valve 97 is separated from the air communication port 96. The coil spring 98 is disposed in the air valve chamber 36 so as to be capable of expanding and contracting in the front-rear direction 8. The coil spring 98 urges the valve 97 rearward, i.e., in a direction such that the valve 97 contacts the air communication port 96. The coil spring 98 has a spring constant that is smaller than a spring constant of the coil spring 78 of the ink supply portion 34.

A wall 93 partitions the air valve chamber 36 from the one end portion (front end portion) of the air flow path 61. The wall 93 is formed with a through-hole 94. The through-hole 94 is sealed with a semi-permeable membrane 80. The air valve chamber 36 is in communication with the one end portion (front end portion) of the air flow path 61 through the through-hole 94.

The ink buffer chamber 62 is provided between the one end portion (front end portion) and the other end portion (rear end portion) of the air flow path 61. More specifically, the ink buffer chamber 62 is provided between the through-hole 94 and the through-hole 46 in the air flow path 61. One end (front end) of the ink buffer chamber 62 is in communication with the one end portion of the air flow path 61 (i.e., the front end portion communicating with the storage chamber 32 through the through-hole 46). Another end (rear end) of the ink buffer chamber 62 is in communication with the other end portion of the air flow path 61 (i.e., the rear end portion communicating with the air valve chamber 36 through the through-hole 94). The storage chamber 32 can thus communicate with the atmosphere through the air flow path 61 and ink buffer chamber 62.

The ink buffer chamber 62 has a cross-sectional area (channel cross-sectional area) larger than a cross-sectional area of the air flow path 61 (i.e., channel cross-sectional area of each of the front end portion and the rear end portion) in a direction perpendicular to a direction of air flow from the one end portion toward the other end portion in the air flow path 61 (i.e., from the one end toward the other end in the ink buffer chamber 62).

More specifically, the air flow path 61 and ink buffer chamber 62 extend generally in the front-rear direction 8 from the through-hole 46 toward the air communication port 96. The direction of air flow from the one end portion toward the other end portion in the air flow path 61 (the direction of air flow from the one end toward the other end in the ink buffer chamber 62) corresponds to the front-rear direction 8 in the present embodiment. Accordingly, each cross-sectional area mentioned above is a plane extending in the up-down direction 7 and in front-rear direction 8. In other words, the cross-sectional area here refers to a cross-sectional area taken along a vertical plane (vertical cross-sectional area). Here, as depicted in FIG. 6, the ink buffer chamber 62 has a vertical dimension greater than a vertical dimension of the air flow path 61 (each of the front end portion and the rear end portion) in the up-down direction 7. Further, although not illustrated in drawings, a right end of the ink buffer chamber 62 and a right end of the air flow path 61 are both defined by the right side wall 37 of the ink cartridge 30, whereas a left end of the ink buffer chamber 62 and a left end of the air flow path 61 are both defined by the left side wall 38 of the ink cartridge 30. Accordingly, the ink buffer chamber 62 and air flow path 61 have the same dimension as each other in the left-right direction 9. Hence, the vertical cross-sectional area of the ink buffer chamber 62 is larger than the vertical cross-sectional area of the air flow path 61.

In the present embodiment, a resistance of the air flow path through which the storage chamber 160 of each tank 103 is allowed to communicate with the atmosphere (i.e., the air flow path 147 connecting the through-hole 119 to the corresponding air communication port 124) is greater than a resistance of the air flow path through which the storage chamber 57 of the ink cartridge 30 is allowed to communicate with the atmosphere (i.e., the air flow path 61 and ink buffer chamber 62). That is, a passage resistance of the air flow path 147 of the tank 103 is greater than a passage resistance of the air flow path 61 and ink buffer chamber 62 of the ink cartridge 30.

Conceivably, passage resistance can be made smaller by enlarging a cross-sectional area of a passage. Also, passage resistance can be increased by making a length of a passage longer, for example. Alternatively, passage resistance can be made either smaller or larger by changing types of a semipermeable membrane that seals a passage. Still alternatively, passage resistance can become larger by increasing a number of semi-permeable membranes that may be provided in a passage.

Note that the passage resistance of the air flow path configured to allow communication of the storage chamber 160 of each tank 103 with the atmosphere may be equal to or smaller than passage resistance of the air flow path configured to allow communication of the storage chamber 57 of the ink cartridge 30 with the atmosphere.

The ink supply portion 34 protrudes rearward from the step wall 49. That is, the ink supply portion 34 is provided at the step wall 49. The ink supply portion 34 has a cylindrical outer shape. The ink supply portion 34 has an inner space serving as the ink valve chamber 35. The ink supply portion 34 has a rear end portion that is open to the outside of the ink cartridge 30 through the ink supply port 71. A seal member 76 is provided at the rear end portion of the ink supply portion 34. The ink supply portion 34 has a front end that is in communication with a lower end portion of the storage chamber 33 through the through-hole 99 as described above. That is, the ink supply portion 34 is in communication with the lower end portion of the storage chamber 33. Put another way, the ink supply port 71 is in communication with the storage chamber 33 via the ink valve chamber 35.

The ink valve chamber 35 is defined by inner peripheral surfaces of the ink supply portion 34. Referring to FIG. 6, the inner peripheral surface defining a lower end of the ink supply portion 34 (to be referred as "inner lower end 34a") also defines a bottom (lowermost end) of the storage chamber 57. On the other hand, the second lower wall 163b defines a bottom (lowermost end) of the storage chamber 160 of the tank 103. The second lower wall 163b is positioned downward relative to the inner lower end 34a of the ink supply portion 34.

A valve 77 and the coil spring 78 are accommodated in the ink valve chamber 35. The valve 77 is configured to move in the front-rear direction 8 to open and close the ink supply port 71 penetrating a center portion of the seal member 76. The coil spring 78 urges the valve 77 rearward. Accordingly, the valve 77 closes off the ink supply port 71 formed in the seal member 76 in a state where no external force is applied to the valve 77.

The seal member 76 is a disk-shaped member having a center portion formed with a through-hole. The seal member 76 is made of an elastic material such as rubber or elastomer, for example. A cylindrical inner peripheral surface defining the through-hole penetrating the center portion of the seal member 76 in the front-rear direction 8 defines the ink supply port 71. The ink supply port 71 has an inner diameter slightly smaller than an outer diameter of the ink needle 102.

As the ink cartridge 30 is attached to the cartridge-attachment portion 110 in a state where the valve 77 closes off the ink supply port 71 and the valve 114 closes the opening 116 of the ink needle 102, the ink needle 102 enters into the ink supply port 71 in the front-rear direction 8. That is, the connecting portion 107 and the ink supply portion 34 are connected to each other during the attachment process of the ink cartridge 30 to the cartridge-attachment portion 110. At this time, the outer peripheral surface of the ink needle 102 provides liquid-tight contact with the inner peripheral surface of the seal member 76 that defines the ink supply port 71, while elastically deforming the seal member 76. As the tip end of the ink needle 102 passes through the seal member 76 and advances into the ink valve chamber 35, the tip end of the ink needle 102 abuts on the valve 77. As the ink cartridge 30 is further inserted into the cartridge-attachment portion 110, the ink needle 102 moves the valve 77 frontward against the urging force of the coil spring 78, thereby opening the ink supply port 71.

While the tip end of the ink needle 102 abuts on the valve 77, the valve 77 abuts on the valve 114 from a front side thereof and pushes the valve 114 rearward. Hence, the valve 114 moves rearward against the urging force of the coil spring 115, thereby opening the opening 116 of the ink needle 102. As a result, the ink stored in the storage chamber 32, the storage chamber 33 and the ink valve chamber 35 is allowed to low into the storage chamber 160 of the corresponding tank 103 through the internal space 117 of the ink needle 102. Here, each of the storage chamber 32, the storage chamber 33, the ink valve chamber 35 and the storage chamber 160 is open to the atmosphere. Accordingly, the ink stored in the storage chamber 32, the storage chamber 33 and the ink valve chamber 35 of the ink cartridge 30 is supplied to the storage chamber 160 of the corresponding tank 103 through the ink supply portion 34 due to hydraulic head difference.

Figure 11:
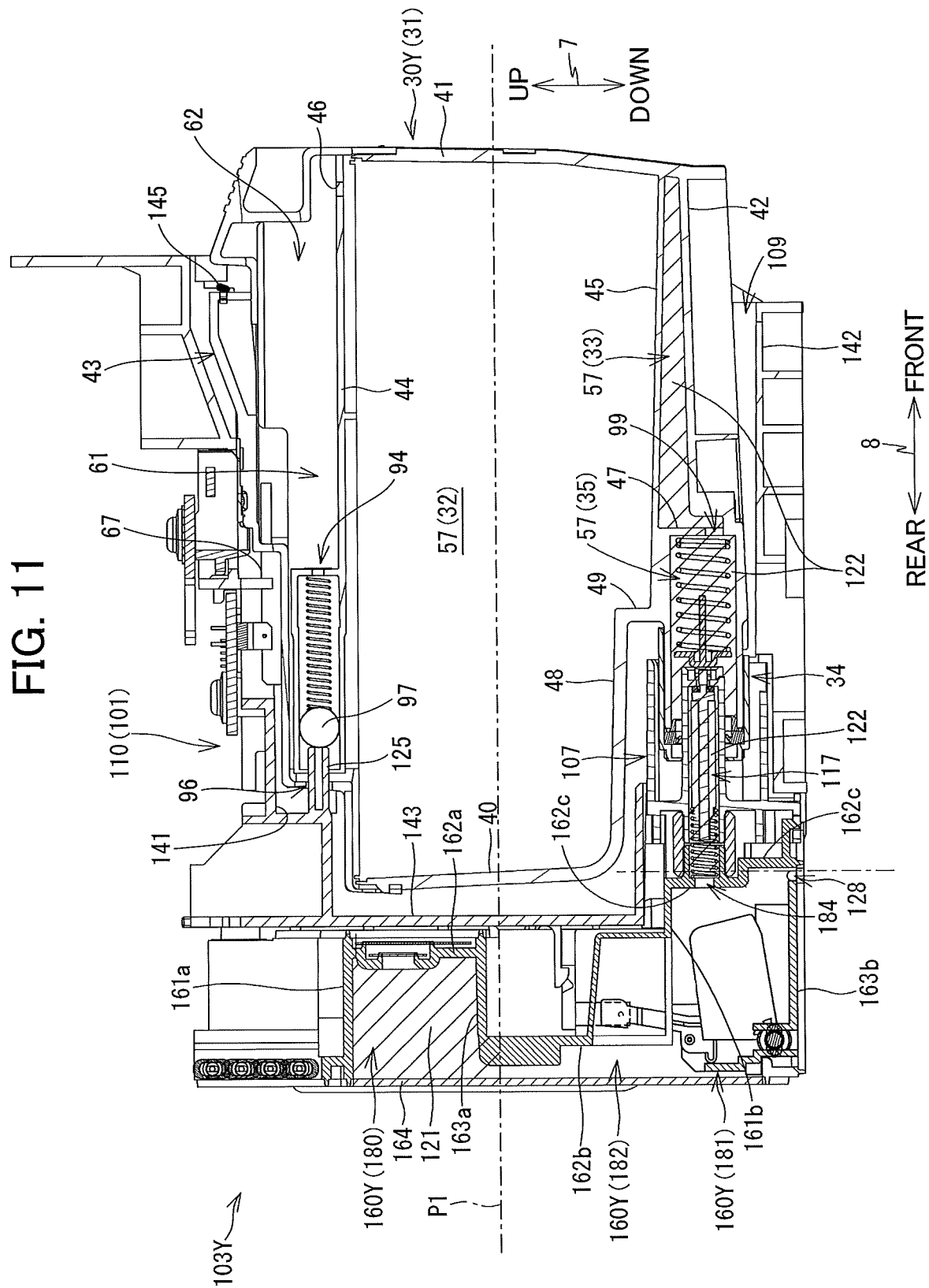
FIG. 11 is a cross-sectional view of the cartridge-attachment portion according to the embodiment taken along the plane VI-VI shown in FIG. 4A and illustrating the state where the ink cartridge 30Y is attached to the cartridge-attachment portion.

Referring to FIG. 11, the air-communication portion of the storage chamber 160Y (the portion above the position P1) has a portion 121 that is positioned rearward relative to the communication port 128. This portion 121 is illustrated by hatching in FIG. 11. The portion 121 has a volume larger than a volume of a portion 122 that is also illustrated by another hatching in FIG. 11. The portion 122 is a sum of: the storage chamber 33 and ink valve chamber 35 of the ink cartridge 30; and a portion of the liquid-storage portion of the storage chamber 160, the portion being positioned frontward relative to the communication port 128.

Note that, although the portion 122 is depicted to have a larger area than the portion 121 is in FIG. 11, the volume of the portion 121 is actually larger than the volume of the portion 122 since the portion 122 has a dimension smaller than a dimension of the portion 121 in the left-right direction 9.

As described above, in the operable posture of the multifunction peripheral 10, the liquid level of the ink is at the position P1 in the state where the stipulated maximum amount of ink is stored in the tank 103 and ink cartridge 30. Here, assume that the multifunction peripheral 10 in the operable posture now changes its posture such that a rear surface of the casing 14 in the operable posture is placed on a horizontal plane (hereinafter, to be referred to as "rear-surface-down posture"). When the multifunction peripheral 10 is in the rear-surface-down posture, the liquid level of the ink in each ink cartridge 30 comes to a position P6 shown in FIG. 14. In this state (in the rear-surface-down posture), referring to FIG. 14, the gap 45a formed in the inner bottom wall 45 is positioned upward (i.e., frontward in the operable posture) relative to the position P6. In other words, the gap 45a is positioned higher than the liquid level provided by the stipulated maximum amount of ink stored in the storage chamber 57 in a state where the multifunction peripheral 10 is disposed in such an orientation that inner surfaces of the rear wall 40 and step wall 49 face upward (i.e., in the rear-surface-down posture).

[Controller 130]

Figure 12:
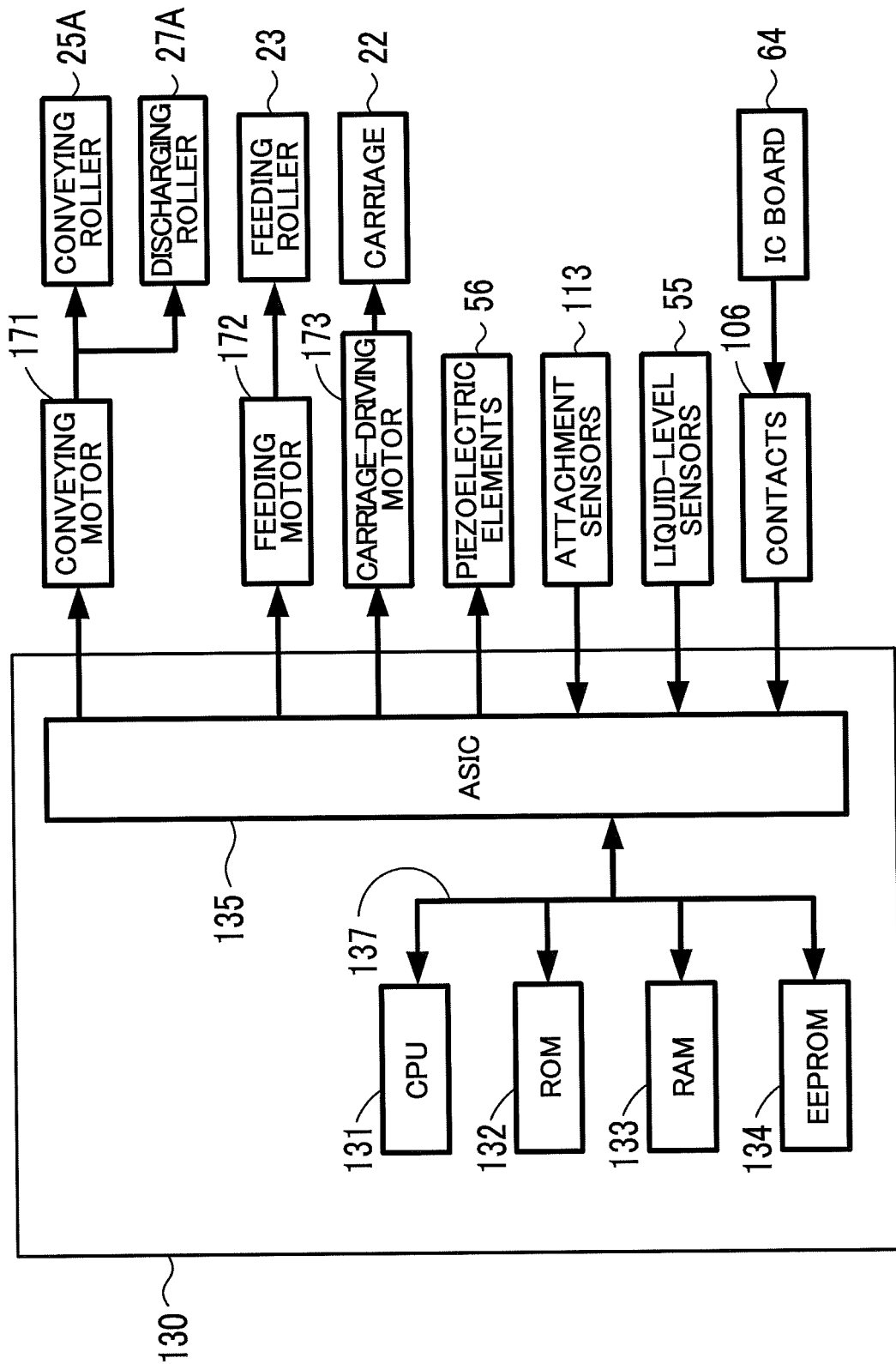
FIG. 12 is a block diagram illustrating a configuration of a controller of the multifunction peripheral according to the embodiment.

Next, an overall configuration of the controller 130 will be described with reference to FIG. 12.

The multifunction peripheral 10 includes the controller 130. The controller 130 is configured to control overall operations of the multifunction peripheral 10. The controller 130 includes a CPU 131, a ROM 132, a RAM 133, an EEPROM 134, an ASIC 135, and an internal bus 137 that connects these components to one another.

The ROM 132 stores programs and the like according to which the CPU 131 can perform various control operations including an image-recording control operation. The RAM 133 is used as a storage area for temporarily storing data, signals, and the like used when the CPU 131 executes the programs. The EEPROM 134 stores settings, flags, and the like that need to be preserved after the multifunction peripheral 10 is turned off.

The conveying motor 171, the feeding motor 172, and the carriage-driving motor 173 are connected to the ASIC 135. The ASIC 135 includes drive circuits for controlling these motors. When the CPU 131 inputs a drive signal for rotating each motor into a corresponding drive circuit thereof, a drive current corresponding to the drive signal is configured to be outputted from the drive circuit to the corresponding motor to rotate the motor. That is, the controller 130 is configured to control rotations of the motors 171, 172 and 173.

Further, the piezoelectric elements 56 are also connected to the ASIC 135. The piezoelectric elements 56 are configured to operate upon receipt of electric power supplied by the controller 130 through a drive circuit (not shown). The controller 130 is configured to control power supply to the piezoelectric elements 56 so that ink droplets can be selectively ejected through the plurality of nozzles 29.

The controller 130 is configured to control the conveying motor 171 to cause the conveying rollers 25 and the discharging rollers 27 to execute an intermittent conveying process when performing image recordation on the sheets 12. The intermittent conveying process is a process in which the conveying rollers 25 and the discharging rollers 27 alternately repeat conveyance of the sheet 12 and halting of the conveyance of the sheet 12 by prescribed line feeds.

The controller 130 is configured to execute an ejection process while halting the conveyance of the sheet 12 in the intermittent conveying process. The ejection process is a process in which the controller 130 controls the power supply to the piezoelectric elements 56 to allow ink droplets to be ejected from the nozzles 29 while moving the carriage 22 in the left-right direction 9. By alternately performing the intermittent conveying process and the ejection process, an image is recorded on each sheet 12.

Further, signals outputted from the respective attachment sensors 113 are configured to be inputted into the ASIC 135. In case that a low signal is inputted from the attachment sensor 113, the controller 130 determines that the ink cartridge 30 has been attached to the cartridge-attachment portion 110. On the other hand, the controller 130 determines that the ink cartridge 30 has not been attached to the cartridge-attachment portion 110 in case that a high level signal is inputted from the attachment sensor 113.

Signals outputted from the respective liquid-level sensors 55 are also configured to be inputted into the ASIC 135. When a low level signal is inputted from the liquid-level sensor 55, the controller 130 determines that the liquid level of the ink stored in the storage chamber 160 of the tank 103 and the liquid level of the ink stored in the ink cartridge 30 are positioned higher than the position P2 in the up-down direction 7.

At a timing when the signal inputted from the liquid-level sensor 55 changes from low level signal to high level signal due to the change in posture of the pivoting member 50, the controller 130 determines that the liquid level of the ink stored in the storage chamber 160 of the tank 103 and the liquid level of the ink stored in the ink cartridge 30 are located at the position P2 in the up-down direction 7.

At this time, the controller 130 is configured to notify a user that only a small amount of ink or no ink is left in the attached ink cartridge 30, by means of displaying some kind of warning message on the display 200 (see FIG. 1), lighting an LED light, or emitting a buzzer sound, for example, so that the user can be informed that the ink cartridge 30 needs to be replaced.

Incidentally, the controller 130 may be configured to count how many dots of ink droplets are ejected from the recording head 21 after the signal outputted from the liquid-level sensor 55 to the controller 130 switches from the low level signal to the high level signal. In this case, the controller 130 may be configured to determine that the liquid level of the ink stored in the storage chamber 160 of the tank 103 (the liquid level of the ink stored in the corresponding ink cartridge 30) is at a predetermined position lower than the position P2 in the up-down direction 7 when the number (value) of the counted dots is greater than or equal to a predetermined value. At this time, the controller 130 may also be configured to notify the user on a residual amount of ink left in the storage chamber 160 in the similar manner as described above. Incidentally, the predetermined value may be determined on a basis of a volume of a portion of the storage chamber 160, the portion being poisoned lower than the connecting portion 107 (or the communication port 184).

In the present embodiment, the controller 130 is configured to determine the liquid level of the ink stored in the storage chamber 57 in the up-down direction 7 for each of the four ink cartridges 30. The controller 130 is also configured to determine the liquid level of the ink stored in the storage chamber 160 in the up-down direction 7 for each of the tanks 103 corresponding to the four ink cartridges 30.

[Operational and Technical Advantages of the Embodiment]

As illustrated in FIG. 3, in the operable posture of the multifunction peripheral 10, the storage chamber 160 is positioned rightward relative to the conveying path 17 and the carriage 22 is movable in the left-right direction 9. Now assume that the multifunction peripheral 10 is displaced by 90 degrees and placed in the left-surface-down posture on a horizontal plane (with the left surface of the casing 14 in the operable posture placed on the horizontal plane to serve as the bottom surface of the casing 14 in the left-surface-down posture). In the left-surface-down posture of the multifunction peripheral 10, the carriage 22 is movable vertically. In a state where the carriage 22 is located at the bottom of the multifunction peripheral 10 in the left-surface-down posture, the recording head 21 mounted on the carriage 22 is located below the storage chambers 160. In a case where ink is stored in the storage chamber 160 at this time, the ink may flow out of the storage chamber 160 into the recording head 21 due to water head difference, possibly resulting in leakage of ink from the recording head 21.

In the present embodiment, as illustrated in FIG. 7, the communication port 128 is arranged to communicate with the storage chamber 160 at a position rightward relative to the center of the storage chamber 160 in the left-right direction 9. Further, in the operable posture illustrated in FIG. 7, the prescribed space (the portion above the position P2 in the embodiment) occupies an upper portion in the storage chamber 160. Air is present in this prescribed space in the operable posture. When the posture of the multifunction peripheral 10 is changed from the operable posture to the left-surface-down posture, the air, which was stored in the prescribed space in the operable posture, moves toward the left beyond the left-right center of the storage chamber 160 in the left-surface-down posture (i.e., toward the bottom of the storage chamber 160 in FIG. 7), and then moves upward into an upper end portion of the storage chamber 160 in the left-surface-down posture (i.e., rightward in FIG. 7). In the left-surface-down posture, the communication port 128 communicates with the upper end portion of the storage chamber 160 (i.e., the right end portion of the storage chamber 160 in FIG. 7). Hence, the air, which has moved to the upper end portion of the storage chamber 160, can flow out of the storage chamber 160 through the communication port 128 in the left-surface-down posture.

As described above, in the embodiment, the prescribed space is a space positioned higher than the position P2, i.e., higher than the liquid level provided by the prescribed amount V2 of ink stored in the storage chamber 160. The volume of the prescribed space is larger than the volume of the ink-circulation space between the communication port 128 and nozzles 29. Hence, the ink-circulation space is filled with the air flowing out of the storage chamber 160 through the communication port 128 in a case where less than the prescribed amount V2 of ink is stored in the storage chamber 160. As a result, water head difference between the storage chamber 160 and recording head 21 is eliminated, thereby preventing outflow of ink through the communication port 128. Even in a case where a particular amount of ink more than the prescribed amount V2 is stored in the storage chamber 160, outflow of ink through the communication port 128 can be confined to such an amount corresponding to the difference between the particular amount and the prescribed amount V2.

Further, the pivoting member 50 and liquid-level sensor 55 can serve to detect the liquid level of the ink stored in the storage chamber 160. In the present embodiment, by controlling air communication status of at least one of the storage chamber 57 and storage chamber 160, the ink stored in the storage chamber 57 can be used up before the ink stored in the storage chamber 160 is used up. This means that the amount of ink left in the storage chamber 160 can be detected even after the storage chamber 57 of the corresponding ink cartridge 30 becomes empty.

Further, in the present embodiment, the second chamber 182 occupies an upper end portion of the storage chamber 160 in the left-surface-down posture of the multifunction peripheral 10. Hence, in the left-surface-down posture, air within the buffer chamber 180 can easily move into the first chamber 181 through the second chamber 182.

Still further, in the left-surface-down posture of the multifunction peripheral 10, the second chamber 182 of the storage chamber 160B occupies the upper end portion of the storage chamber 160B and the third chamber 183 is positioned below the second chamber 182. Accordingly, in the left-surface-down posture, the air within the buffer chamber 180 can move to the first chamber 181 through the second chamber 182, while the ink in the first chamber 181 can move into the buffer chamber 180 through the third chamber 183. In this way, this structure can promote circulation of air and ink within the storage chamber 160B.

Further, the right end of the first chamber 181 is positioned rightward relative to the right end of the second chamber 182. Further, as illustrated in FIG. 7, the communication port 128 is formed in the lower end portion of the side wall 165 defining the portion of the first chamber 181 positioned rightward relative to the right end of the second chamber 182. That is, in the left-surface-down posture of the multifunction peripheral 10, the communication port 128 is positioned higher (rightward in FIG. 7) than the second chamber 182. With this structure, even if the liquid surface of ink stored in the storage chamber 160 may make contact with the left surface of the side wall 165 in a region defining the second chamber 182 due to surface tension of the ink, the liquid surface is less likely to reach the left surface of the lower end portion of the side wall 165 to make contact therewith due to the surface tension. Outflow of ink through the communication port 128 can be suppressed accordingly.

In case that the liquid surface of the ink stored in the storage chamber 160 is attracted to the left surface of the lower end portion of the side wall 165 due to the surface tension when the multifunction peripheral 10 is displaced from the operable posture to the left-surface-down posture, conceivably, the ink in contact with the left surface of the lower end portion of the side wall 165 may flow out of the storage chamber 160 through the communication port 128. However, according to the structure of the present embodiment, the liquid surface of ink in the left-surface-down posture is located away from the left surface of the lower end portion of the side wall 165 by more than the distance L1. With this structure, since the liquid surface of ink is separated too far away from the left surface of the lower end portion of the side wall 165, the liquid surface is prevented from being attracted to the left surface due to surface tension in the left-surface-down posture. Accordingly, there is little chance that the liquid surface of the ink makes contact with the left surface of the lower end portion of the side wall 165, thereby preventing the ink from reaching and entering into the communication port 128 in the left-surface-down posture of the multifunction peripheral 10.

Further, the residual amount of ink in the storage chamber 160 can be increased by simply replacing the attached ink cartridge 30 with a new ink cartridge 30.

The storage chamber 160 of the embodiment includes the first chamber 181 for storing ink and the buffer chamber 180 for accumulating air. The first chamber 181 and buffer chamber 180 respectively constitute upper and lower end portions of the storage chamber 160 in the operable posture. Even in case that the multifunction peripheral 10 is displaced from the operable posture into the left-surface-down posture, the air in the buffer chamber 180 can move to the upper portion of the storage chamber 160 in the left-surface-down posture (i.e., the right end portion of the storage chamber 160 in the operable posture). As a result, ink is suppressed from entering the communication port 128 from the storage chamber 160.

Conceivably, bubbles may be generated in the storage chamber 160 as a result of the circulation of the ink and air within the storage chamber 160 due to the change in posture of the multifunction peripheral 10 from the operable posture to the left-surface-down posture. According to the structure of the present embodiment, such generation of bubbles can be suppressed as described below.

In accordance with the change in posture of the multifunction peripheral 10 from the operable posture to the left-surface-down posture, the air in the buffer chamber 180 moves into the first chamber 181 through the second chamber 182, while the ink in the first chamber 181 moves into the buffer chamber 180 through the second chamber 182. In the present embodiment, the horizontal cross-sectional area of the second chamber 182 is smaller than that of the buffer chamber 180 and is also smaller than that of the first chamber 181. Hence, mixing of ink and air can be suppressed within the second chamber 182, thereby suppressing generation of bubbles therein. As a result, outflow of bubbles through the communication port 128, that is, outflow of ink through the communication port 128 can be reduced.

In the left-surface-down posture of the multifunction peripheral 10, the liquid surface of the ink may come to a position near the right side wall 186. For example, as illustrated in FIG. 8, in a case where the liquid surface is located at the position P5 in the left-surface-down posture of the multifunction peripheral 10, the liquid surface is attracted to the right side wall 186 due to the surface tension of the ink to allow the liquid surface to make contact with the right side wall 186. This structure can inhibit generation of bubbles attributed to vibration of the multifunction peripheral 10 during transportation.

In a case where the liquid surface of the ink is located below the right side wall 186 (below the position P5 in FIG. 8) in the left-surface-down posture of the multifunction peripheral 10, the right side wall 186 functions to block outflow of generated bubbles through the communication port 128. This structure can thus prevent bubbles generated as a result of change in posture of the multifunction peripheral 10 from flowing out of the storage chamber 160 through the communication port 128.

In a case where the liquid level of the ink is located above the right side wall 186 (above the position P5 in FIG. 8) in the left-surface-down posture of the multifunction peripheral 10, only the ink located above the right side wall 186 is mixed with air, while the ink located below the right side wall 186 is not mixed with air. That is, the amount of ink to be mixed with air can be reduced. Generation of bubbles can be thus suppressed.

Here, for comparison, assume that the right side wall 186 is arranged to oppose the communication port 128 in the left-right direction 9. In this case, in the left-surface-down posture, those bubbles that may be generated at positions opposing the right side wall 186 in the left-right direction 9 (i.e., vertical direction in the left-surface-down posture) cannot move further leftward (i.e., downward in the left-surface-down posture) relative to the right side wall 186, since the right side wall 186 blocks such leftward movement of the bubbles (i.e., downward movement of the bubbles in the left-surface-down posture). As a result, the generated bubbles are highly likely to move rightward (i.e., upward in the left-surface-down posture), possibly resulting in outflow of the bubbles through the communication port 128. On the other hand, in the present embodiment, the right side wall 186 is positioned not to oppose the communication port 128. That is, the right side wall 186 is positioned offset from the communication port 128 in the front-rear direction 8 as well as in the up-down direction 7. With this structure, the bubbles generated at positions opposing the right side wall 186 in the left-right direction 9 (i.e., vertical direction in the left-surface-down posture) are allowed to move further leftward (i.e., downward in the left-surface-down posture) beyond the right side wall 186, thereby suppressing the bubble from flowing out of the storage chamber 160 through the communication port 128.

Further, in the present embodiment, the gap is formed between the upper end of the right side wall 186 and the lower surface of the second upper wall 161b, as illustrated in FIG. 6. With this structure, in the left-surface-down posture, the ink in the first chamber 181 can be smoothly supplied to the second chamber 182 through the gap.

In the state where the stipulated maximum amount of ink is stored in the storage chamber 160, it is most likely that bubbles generated at the time of the change in posture of the multifunction peripheral 10 may flow out of the storage chamber 160 through the communication port 128. When the stipulated maximum amount of ink is accommodated in the storage chamber 160, the liquid level of the ink comes to the position P5 (see FIG. 8) when the multifunction peripheral 10 is disposed in the left-surface-down posture. As illustrated in FIG. 8, in the left-surface-down posture of the multifunction peripheral 10, the left-right position of the right side wall 186 is coincident with the position P5. In the left-surface-down posture, since the liquid level provided by the stipulated maximum amount of ink (the position P5) is located adjacent to the right side wall 186, the liquid surface is attracted to the right side wall 186 to make contact therewith due to the surface tension of the ink. In this way, this structure can suppress formation of bubbles attributed to the vibration of the multifunction peripheral 10 during transportation.

Further, due to the change in posture of the multifunction peripheral 10 from the operable posture to the left-surface-down posture, air within the buffer chamber 180 is allowed to flow into the first chamber 181 mainly through the second chamber 182, while the ink in the first chamber 181 is allowed to flow into the buffer chamber 180 mainly through the third chamber 183. That is, the amount of ink entering into the second chamber 182 can be reduced, thereby suppressing generation of bubbles in the second chamber 182.

In the operable posture of the multifunction peripheral 10, the storage chamber 160 is positioned frontward relative to the nozzles 29, as depicted in FIG. 3. In a case where the multifunction peripheral 10 in the operable posture is displaced by 90 degrees to assume the rear-surface-down posture (the rear surface of the casing 14 in the operable posture is placed on a horizontal plane to serve as the bottom surface of the casing 14), the storage chamber 160 is located upward relative to the nozzles 29. Therefore, there arises a possibility that the ink stored in the storage chamber 160 may flow out of the storage chamber 160 through the communication port 128 into recording head 21 by water head difference, which may cause outflow of ink from the recording head 21.

However, in the present embodiment, the air-communication portion is positioned above the liquid-storage portion in each storage chamber 160 in the operable posture of the multifunction peripheral 10. Accordingly, when the posture of the multifunction peripheral 10 is changed from the operable posture to the rear-surface-down posture, the air-communication portion and the liquid-storage portion become aligned with each other horizontally. The ink stored in the liquid-storage portion therefore flows into the air-communication portion, further contributing to reduction in outflow of the ink stored in the storage chamber 160 through the communication port 128.

Further, when the multifunction peripheral 10 is displaced from the operable posture to the rear-surface-down posture, the ink stored in the storage chamber 57 of the ink cartridge 30 may enter into the corresponding storage chamber 160 through the ink supply port 71. The ink entered into the storage chamber 160 may then flow into the recording head 21 through the communication port 128 by the water head difference, possibly resulting in ink outflow through the recording head 21.

In the present embodiment, the storage chamber 57 of the ink cartridge 30 is generally divided into two portions: the storage chamber 32; and the storage chamber 33 and ink valve chamber 35 partitioned from the storage chamber 32 by the inner bottom wall 45. With this structure, referring to FIGS. 14A and 14B, when the multifunction peripheral 10 is placed in the rear-surface-down posture, of the ink stored in the storage chamber 32, ink located below the gap 45a (i.e., rearward of the gap 45a in the operable posture) cannot move into the storage chamber 33 and ink valve chamber 35 through the gap 45a. That is, there is no chance for the ink positioned below the gap 45a in the rear-surface-down posture to flow into the storage chamber 160. This structure of the embodiment can reduce the amount of ink that may enter into the storage chamber 160.

When the posture of the multifunction peripheral 10 changed to the rear-surface-down posture from the operable posture, following ink may possibly flow into the recording head 21 through the communication port 128: the ink stored in the storage chamber 33 and ink valve chamber 35; the ink stored in the storage chamber 32 and positioned above the gap 45a (frontward of the gap 45a in the operable posture); and the ink stored in the liquid-storage portion of the storage chamber 160 and positioned above the communication port 128 (i.e., frontward of the communication port 128 in the operable posture).

In the present embodiment, referring to FIG. 11, the volume of the hatched portion 121 (the portion of the air-communication portion positioned rearward relative to the communication port 128) is larger than the volume of the hatched portion 122 (the sum of: the volume of the storage chamber 32; the volume of the ink valve chamber 35; and the volume of the portion of the liquid-storage portion positioned frontward relative to the communication port 128). This structure can reduce the amount of ink that may flow out of the storage chamber 160 through the communication port 128 as a result of displacement of the multifunction peripheral 10 from the operable posture to the rear-surface-down posture.

Figure 14B:
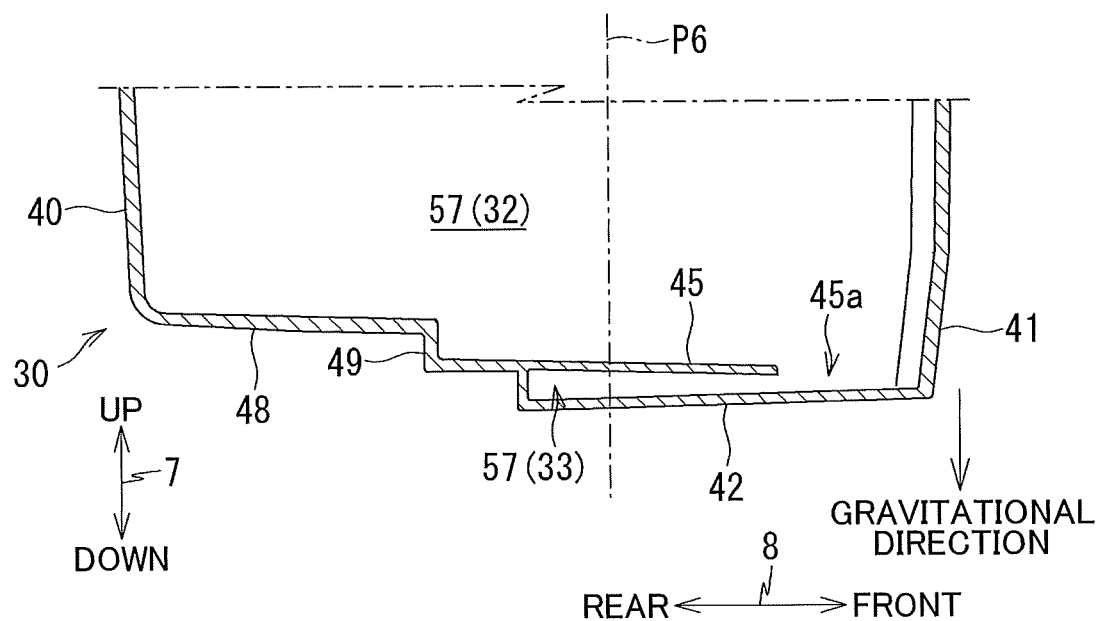
FIG. 14B is a cross-sectional view of the ink cartridge according to the embodiment taken along a plane V-V shown in FIG. 14A.

Further, referring to FIGS. 14A and 14B, in the state where the multifunction peripheral 10 is in the rear-surface-down posture, the gap 45a is positioned upward (frontward in the operable posture) relative to the liquid level provided by the stipulated maximum amount of ink (i.e., corresponding to the position P6). Accordingly, in the rear-surface-down posture, the ink stored in the storage chamber 32 does not enter into the storage chamber 160, while only the ink stored in the storage chamber 33 and ink valve chamber 35 is allowed to enter into the storage chamber 160. This structure of the present embodiment can reduce the amount of ink that may enter into the storage chamber 160 from the storage chamber 57 at the time of displacement of the multifunction peripheral 10 into the rear-surface-down posture from the operable posture.

Further, in the embodiment, the through-hole 119 of each storage chamber 160 is positioned below the communication port 128 in the rear-surface-down posture. Thus, when the multifunction peripheral 10 is changed into the rear-surface-down posture from the operable posture, ink stored in the storage chamber 160 may reach the through-hole 119. However, since the through-hole 119 is sealed by the semi-permeable membrane 118 in the present embodiment, leakage of ink from the storage chamber 160 through the through-hole 119 can be prevented.

Further, as depicted in FIG. 8, in the operable posture of the multifunction peripheral 10, the communication port 128M is positioned rightward relative to the communication port 184M and storage chamber 57M. Thus, when the multifunction peripheral 10 is displaced into the left-surface-down posture from the operable posture, the communication port 128M is located upward relative to the communication port 184M and storage chamber 57M. In the left-surface-down posture, the ink positioned upward of the communication port 184M in the storage chamber 160M flows into the storage chamber 57M through the communication port 184M. This structure of the embodiment can reduce the amount of ink stored in the storage chamber 160M and increase the amount of air in the storage chamber 160M.

Here, in the operable posture, the communication port 128M allows ink to flow out of the storage chamber 160M at a position offset to the right from the left-right center of the storage chamber 160M. This means that, in the left-surface-down posture, the communication port 128M allows ink outflow from the storage chamber 160 at a position upward relative to the vertical center of the storage chamber 160M. Since the ink in the storage chamber 160M flows into the corresponding storage chamber 57M as a result of the change in posture of the multifunction peripheral 10 into the left-surface-down posture from the operable posture, the amount of ink in the storage chamber 160M decreases and the liquid level of the ink in the storage chamber 160M falls down in the left-surface-down posture. Accordingly, the amount of ink that may flow out of the storage chamber 160M through the communication port 128M can be made smaller, thereby suppressing the ink stored in the storage chamber 160M from leaking from the recording head 21.

Likewise, with regard to the ink stored in the storage chambers 160C and 160Y, ink leakage through the recording head 21 is less likely to occur in the structure of the embodiment.

Further, as illustrated in FIG. 13, the inner bottom wall 45 extends rightward from the inner surface of the left side wall 38 in the operable posture. Also, in the operable posture, the left edge of the gap 45a is positioned rightward relative to the left edge of the through-hole 46. Further, in the operable posture, in the storage chamber 57, the portion above the inner bottom wall 45 (storage chamber 32) communicates with the air flow path 61 through the through-hole 46, whereas the potion below the inner bottom wall 45 (the storage chamber 33 and ink valve chamber 35) communicates with the ink supply port 71.

When the multifunction peripheral 10 is displaced into the left-surface-down posture from the operable posture, the inner bottom wall 45 extends upward from the inner surface of the left side wall 38 that now constitutes the bottom of the ink cartridge 30 in the left-surface-down posture. In the left-surface-down posture, the lower edge of the gap 45a (the left edge in the operable posture) is positioned higher (rightward in FIG. 13) than the lower edge of the through-hole 46 (the left edge in the operable posture). Hence, in the left-surface-down posture, the ink flowing into the storage chamber 57 from the corresponding storage chamber 160 through the ink supply port 71 may be accumulated in the storage chamber 33 and ink valve chamber 35 up to a level equal to the lower edge of the gap 45a. That is, a larger amount of ink can flow into the storage chamber 57 than otherwise, when the multifunction peripheral 10 is displaced into the left-surface-down posture from the operable posture.

Further, in the embodiment, the passage resistance of the air flow path 61 configured to allow the storage chamber 57 to communicate with the atmosphere is smaller than the passage resistance of the air flow path 147 configured to allow the storage chamber 160 to communicate with the atmosphere. With this configuration, the ink stored in the storage chamber 57 can be used, preferentially, ahead of the ink stored in the storage chamber 160 of the tank 103.

Further, according to the structure of the embodiment, the ink that may flow into the storage chamber 57 from the storage chamber 160 as a result of the change in posture of the multifunction peripheral 10 from the operable posture to the left-surface-down posture can be stored in the ink buffer chamber 62 of the corresponding ink cartridge 30.

Further, in the embodiment, the semi-permeable membrane 118 of each storage chamber 160 can block outflow of ink into the air flow path 147, whereas the semi-permeable membrane 80 of each ink cartridge 30 can prevent outflow of ink into the air valve chamber 36 constituting the air flow path 61.

Further, as illustrated in FIG. 8, with regard to any neighboring two of the four tanks 103 juxtaposed in the left-right direction 9, the communication port 128 of the tank 103 positioned on the left is positioned rightward relative to the left end of the ink cartridge 30 corresponding to the tank 103 positioned on the right. This structure can realize compact arrangement of the plurality of tanks 103 in the left-right direction 9.

[Modifications and Variations]

While the description has been made in detail with reference to the embodiment thereof, it would be apparent to those skilled in the art that many modifications and variations may be made therein without departing from the scope of the disclosure.

For example, the communication port 128 is formed in the lower end portion of the side wall 165 (the portion defining the right end of the lower portion of the first chamber 181) in the embodiment. That is, the communication port 128 extends in the left-right direction 9 in the depicted embodiment. However, the communication port 128 may not necessarily be formed in the lower end portion of the side wall 165. For example, the communication port 128 may be formed at a position leftward relative to the right end of the storage chamber 160. Put different way, the communication port 128 need not necessarily extend in the left-right direction 9, but may extend in a direction perpendicular to the left-right direction 9.

Figure 15:
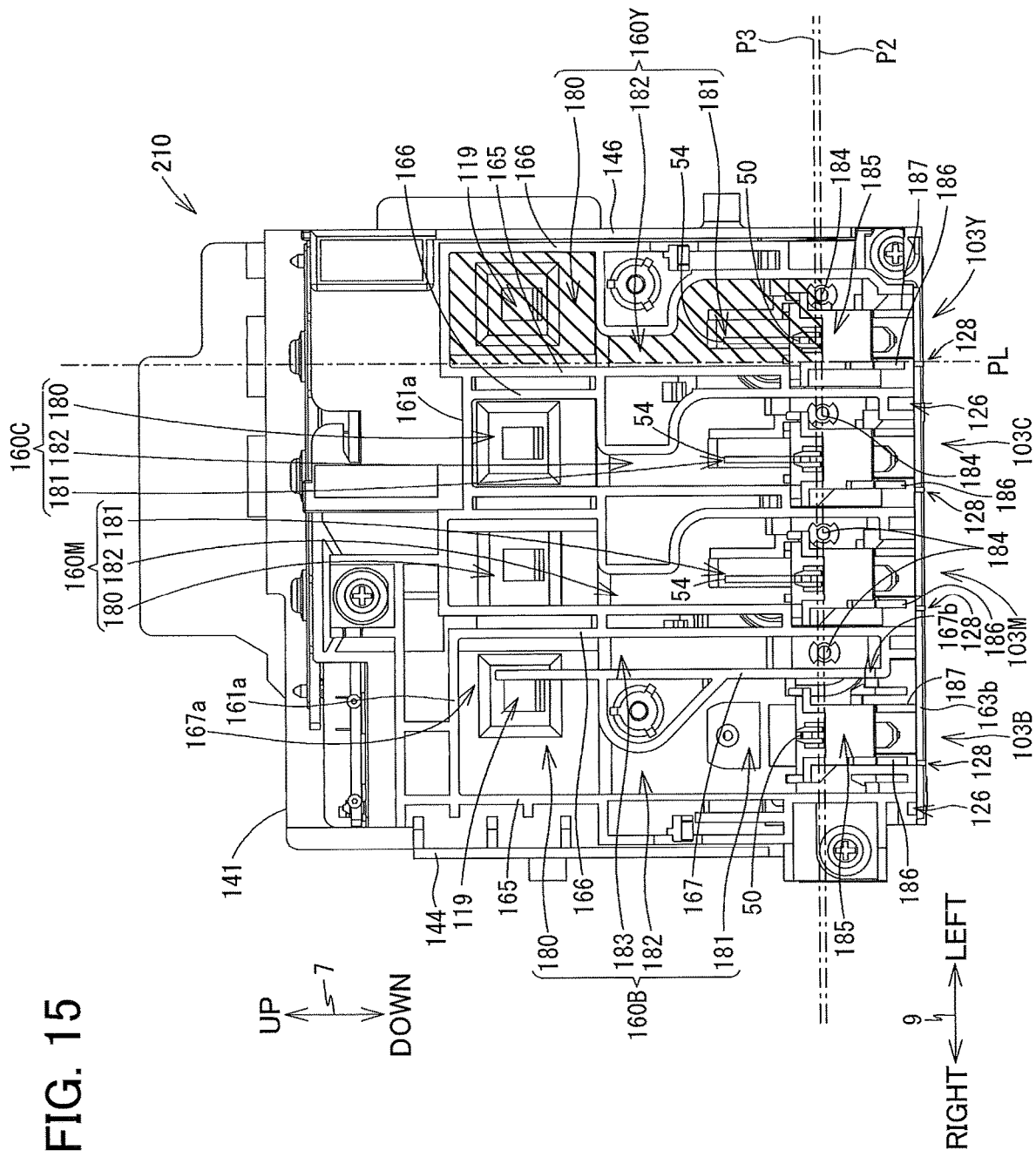
FIG. 15 is a cross-sectional view of a cartridge-attachment portion according to a variation of the embodiment taken along a vertical plane corresponding to the vertical plane VII-VII shown in FIG. 6.

For example, the communication port 128 may be formed at the third front wall 162c or at the second lower wall 163b. FIG. 15 depicts a cartridge-attachment portion 210 according to a variation in which the communication port 128 is formed in the second lower wall 163b at a position rightward relative to the center of the storage chamber 160 in the left-right direction 9.

In the structure of FIG. 15, the communication port 128 is formed in the second lower wall 163b to penetrate the same in the up-down direction 7. The prescribed space in the storage chamber 160 of this variation is indicated by hatching in FIG. 15. Specifically, assuming that an imaginary line PL is a line passing through a left end of the communication port 128 of the second lower wall 163b in FIG. 15, the prescribed space is a portion of the storage chamber 160 that is positioned: above the position P2 in the up-down direction 7; and rightward relative to the imaginary plane PL (i.e., rightward relative to the communication port 128) in the left-right direction 9. In this variation, the volume of the prescribed space is larger than a volume of a portion of the storage chamber 160 positioned rightward relative to the left end of the communication port 128 (i.e., a portion of the storage chamber 160 positioned rightward relative to the imaginary plane PL).

With this structure of the variation, in a state where less than the prescribed amount V2 of ink (providing the liquid level of P2) is stored in the storage chamber 160, the communication port 128 is positioned higher than the liquid level in the left-surface-down posture. Thus, ink cannot flow into the communication port 128. Likewise, even in a state where a certain amount of ink more than the prescribed amount V2 (providing the liquid level of P2) is stored in the storage chamber 160, the amount of ink that may reach the communication port 128 in the left-surface-down posture can be confined to such an amount equal to the difference between the prescribed amount V2 and the certain amount.

Further, in the depicted embodiment, as illustrated in FIG. 8, with regard to any neighboring two of the four tanks 103 juxtaposed in the left-right direction 9, the left end of the storage chamber 160 positioned on the right is located rightward relative to the right end of the storage chamber 160 positioned on the left. That is, the neighboring two tanks 103 do not have any portion whose left-right positions are coincident with each other. In other words, the neighboring two tanks 103 do not have any portion aligned with each other in the up-down direction 7. However, the neighboring two tanks 103 may have portions whose left-right positions are coincident with (overlapping with) each other. In this case, the communication port 128 belonging to the tank 103 positioned on the left may be arranged at such overlapping portion.

Figure 16:
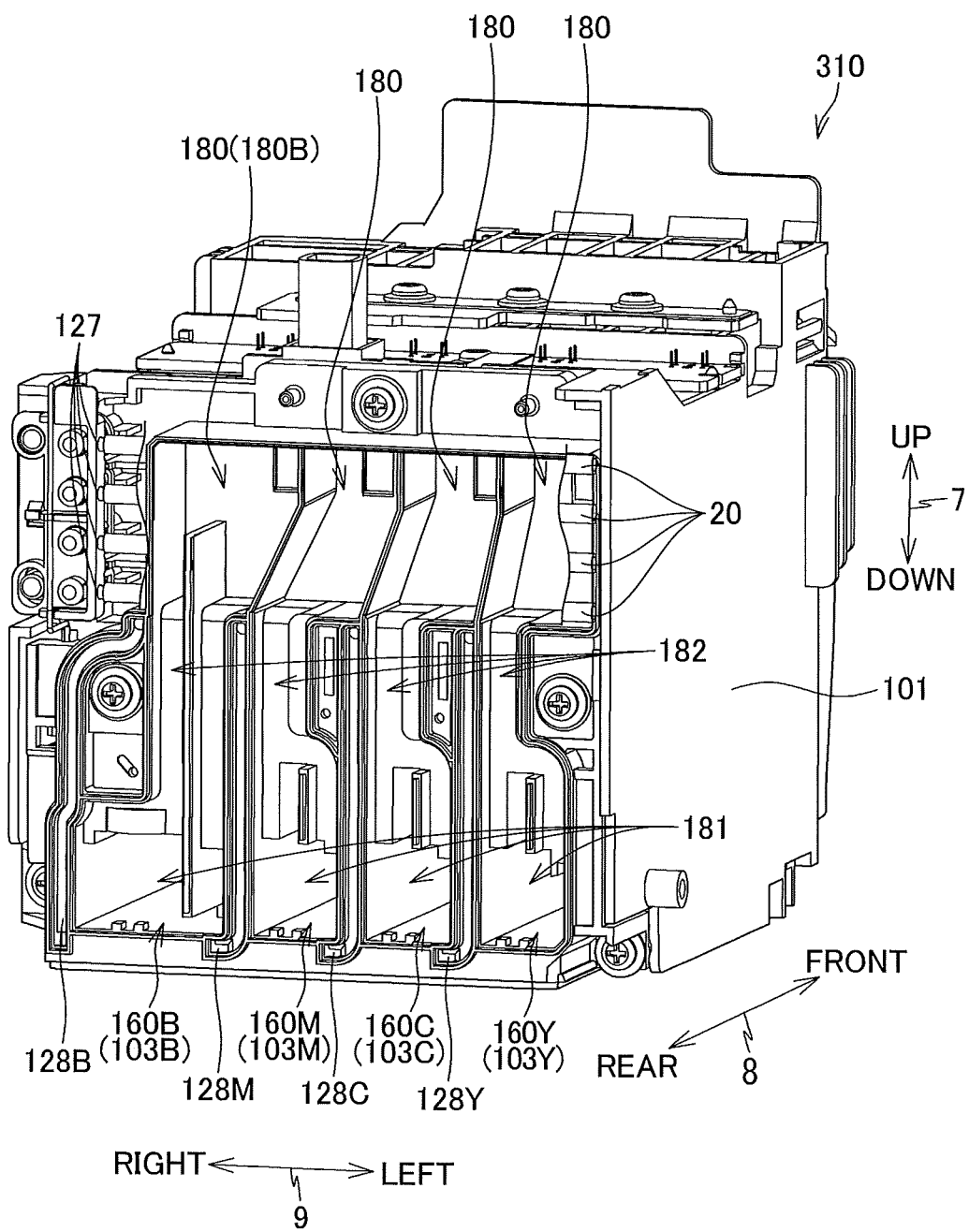
FIG. 16 is a perspective view illustrating tanks of a cartridge-attachment portion according to another variation of the embodiment.

For example, FIG. 16 depicts a cartridge-attachment portion 310 according to another variation of the embodiment. As illustrated in FIG. 16, the storage chamber 160B of the tank 103B positioned on the right may have a portion (buffer chamber 180B) whose left-right position is coincident with a left-right position of the communication port 128M belonging to the tank 103M positioned on the left of the tank 103B with respect to the left-right direction 9. That is, with respect to the neighboring two tanks 103B and 103M, the tank 103B positioned on the right has a portion (buffer chamber 180B) which is aligned with a portion of the tank 103M (communication port 128M) positioned on the left of the tank 103B in the up-down direction 7.

Further, in the depicted embodiment, the communication port 128 is positioned frontward relative to the buffer chamber 180 in the front-rear direction 8, as illustrated in FIG. 6. However, the front end of the buffer chamber 180 may be positioned further frontward than the communication port 128. That is, the air-communication portion of the storage chamber 160 including the buffer chamber 180 may be a space extending frontward up to a position further frontward than the communication port 128 in the front-rear direction 8.

In the embodiment, the air communication ports 124 are provided rearward relative to each communication port 128 (see FIGS. 4 and 6). However, the air communication ports 124 may be located forward relative to each communication port 128. That is, the air communication ports 124 may allow each of the buffer chambers 180 to communicate with the atmosphere at a position frontward of the corresponding communication port 128. Further, in this variation, the through-hole 119 is located higher than the communication port 128 when the orientation of the multifunction peripheral 10 is changed into the rear-surface-down posture from the operable posture. This structure of the variation can also reduce a likelihood that ink flows out of the storage chamber 160 through the communication port 128 in the rear-surface-down posture.

Still further, in the storage chamber 160 of the depicted embodiment, the buffer chamber 180 and first chamber 181 are formed to protrude further frontward relative to the second chamber 182. However, the buffer chamber 180 and the first chamber 181 may protrude further rearward relative to the second chamber 182.

Further, while the cartridge-attachment portion 110 is disposed at the position frontward of the recording head 21 and rightward of the conveying path 17 in the embodiment, the cartridge-attachment portion 110 may be disposed at a position rearward relative to the recording head 21 and leftward of the conveying path 17.

In the depicted embodiment, the multifunction peripheral 10 is configured to detachably accommodate the ink cartridges 30. That is, replenishment of ink can be performed by replacing the ink cartridges 30 with new ones. However, instead of the ink cartridges 30, the multifunction peripheral 10 may include tanks each provided with an inlet port. In this case, these tanks may serve as main tanks each having the same structure as the ink cartridge 30 of the embodiment: and the tank 103 of the embodiment may serve as a sub tank in communication with the main tank. When the residual amount of ink stored in the main tank becomes smaller, new ink can be filled into the main tank through the corresponding inlet port. Here, the main tanks may be fixed to the casing 14, or may be made detachable relative to the casing 14.

Still alternatively, in a case where the multifunction peripheral 10 do not include the ink cartridges 30, each of the tanks 103 may be provided with the inlet port for replenishment of ink. In this case, when the residual amount of ink in the tank 103 becomes smaller, ink can be injected through the corresponding inlet port. Incidentally, the tank 103 of this variation may be larger in size (volume) than the tank 103 of the embodiment.

Still further, while the attachment sensor 113 and the liquid-level sensor 55 are optical sensors each having the light-emitting portion and the light-receiving portion in the embodiment, the attachment sensor 113 and the liquid-level sensor 55 may be sensors of a different type from the optical sensor, such as a proximity sensor.

In the embodiment, the controller 130 is configured to detect that the liquid level of the ink stored in the storage chamber 160 falls below the position P2 by the pivotal movement of the pivoting member 50 disposed within the storage chamber 160 of each tank 103. However, the liquid level of the ink stored in the storage chamber 160 may be configured to be detected by a mechanism other than the pivoting of the pivoting member 50.

For example, a prism may be disposed at the storage chamber 160 of each tank 103 at the same height as the position P2. Whether or not the liquid level of the ink stored in the storage chamber 160 of the tank 103 is higher than the position P2 may be determined on a basis of a travelling direction of light incident on the prism that may vary depending on whether or not the liquid level is higher than the prism, that is, on a basis of transmission status of the light incident on the prism.

Alternatively, a light-transmission portion may be provided in the storage chamber 160 and an optical sensor may be disposed outside of the storage chamber 160. More specifically, the light-transmission portion may be at least a portion of the walls constituting the tank main body of the tank 103, the portion being formed by material capable of transmitting light and being located at least at the same height as the position P2 in the up-down direction 7. Whether or not the liquid level of the ink stored in the storage chamber 160 of the tank 103 is at the same height as or lower than the position P2 may be determined on a basis of whether or not light incident on the light-transmission portion of the tank 103 may be received at a light-receiving portion of the optical sensor without being attenuated by the ink stored in the storage chamber 160 while passing through the storage chamber 160. Here, whether the light incident on the light-transmission portion of the tank 103 may be received at the light-receiving portion of the optical sensor may vary depending on whether or not the liquid level is higher than a light emitting portion of the optical sensor. That is, whether or not the liquid level of the ink stored in the storage chamber 160 is at a position equal to or lower than the position P2 may be determined based on by how much the light incident on the light-transmission portion of the tank 103 may be attenuated by the ink stored in the storage chamber 160 while passing through the storage chamber 160, that is, based on attenuation status of the light incident on the light-transmission portion of the tank 103. For example, the light-receiving portion may receive the incident light without being attenuated by the ink stored in the storage chamber 160; or may not receive the light attenuated by the ink; or may not receive the incident light at all.

Still alternatively, for example, two electrodes may be disposed in the storage chamber 160 of each tank 103. One of the two electrodes may have a lower end at a position slightly higher than the position P2, while the other of the two electrodes may have a lower end at a position below the position P2. Whether the liquid level of the ink stored in the storage chamber 160 of the tank 103 is lower than or equal to the position P2 may be determined depending on whether or not current flows between the two electrodes through the ink.

Still further, in the depicted embodiment, the through-hole 119 is sealed by the semi-permeable membrane 118. However, the through-hole 119 may not be sealed with the semi-permeable membrane 118. Likewise, while the through-hole 94 is sealed by the semi-permeable membrane 80 in the embodiment, the through-hole 94 may not be sealed by the semi-permeable membrane 80.

Still further, the ink cartridge 30 is configured to be attached to the cartridge-attachment portion 110 by being inserted into the cartridge-attachment portion 110 in the horizontal direction. However, the ink cartridge 30 may be attached to the cartridge-attachment portion 110 by being inserted into the cartridge-attachment portion 110 in a direction other than the horizontal direction, for example, in the up-down direction 7.

Still further, in the above-described embodiment, the connecting portion 107 of the cartridge-attachment portion 110 and the ink supply portion 34 of the ink cartridge 30 both extend in the horizontal direction. However, the connecting portion 107 and the ink supply portion 34 may extend in a direction other than the horizontal direction. For example, the connecting portion 107 may protrude upward from the case 101 while the ink supply portion 34 may protrude downward from the bottom wall (bottom wall 42 or the sub-bottom wall 48) of the ink cartridge 30. Incidentally, in this case, the position P1 may be set at a center position of the connecting portion 107 in the up-down direction 7 or at a center position of the ink supply portion 34 in the up-down direction 7, for example.

While ink serves as an example of liquid in the depicted embodiment, a pretreatment liquid that is ejected onto the recording paper prior to the ink during an image recording operation, for example, may be stored in the ink cartridge 30 and the tank 103, in place of the ink. Alternatively, water that is used for cleaning the recording head 21 may be stored in the ink cartridge 30 and the tank 103.

<Remarks>

The multifunction peripheral 10 is an example of an image-recording apparatus. The sheet 12 is an example of a sheet. The ink cartridge 30 is an example of a first tank. The ink is an example of liquid. The tank 103 is an example of a second tank, and an example of a tank. The storage chamber 57 is an example of a first storage chamber. The air communication port 96, air flow path 61, through-hole 94, semi-permeable membrane 80 and through-hole 46 are an example of a first air communication portion and an example of a first air communication passage. The ink buffer chamber 62 is an example of a buffer space. The storage chamber 160 is an example of a second storage chamber and an example of a liquid storage chamber. The air communication port 124, air flow path 147, through-hole 119 and the semipermeable membrane 118 are an example of a second air communication portion, an example of a second air communication passage, and an example of an air communication portion. The communication port 184 is an example of a communication port, and an example of a liquid inlet port. The communication port 128 is an example of a liquid outlet port. The recording head 21 is an example of a recording head. The nozzles 29 are an example of a nozzle. The conveying rollers 25 and discharging rollers 27 are an example of conveying mechanism. The buffer chamber 180 is an example of a buffer chamber. The first chamber 181 is an example of a first chamber. The second chamber 182 is an example of a second chamber. The third chamber 183 is an example of a third chamber. The pivoting member 50 and liquid-level sensor 55 is an example of a liquid-level detector. The connecting portion 107 is an example of a connecting portion. The ink passage 126 and ink tubes 20 are an example of a liquid channel. The inner bottom wall 45 is an example of a wall portion. The storage chamber 32 is an example of an upper space. The storage chamber 33 and ink valve chamber 35 are an example of a lower space. The ink supply portion 34 is an example of a supplying portion. The gap 45a is an example of a gap. The step wall 49 (the rear surface of the step wall 49) is an example of a partitioning surface. The right side wall 186 is an example of a wall. The side wall 165 (the left surface of the side wall 165) is an example of a specific surface and an example of an end surface. The through-hole 46 is an example of a communication opening. The partition wall 44 (the lower surface of the partition wall 44) is an example of a top surface. The left side wall 38 (the inner surface of the left side wall 38) is an example of a side surface. The front-rear direction 8 is an example of a depthwise direction. The up-down direction 7 is an example of a vertical direction. The left-right direction 9 is an example of a widthwise direction. The frontward direction is an example of a first depthwise direction, while the rearward direction is an example of a second depthwise direction. The rightward direction is an example of a first widthwise direction, while the leftward direction is an example of a second widthwise direction.

What is claimed is:

1. An image-recording apparatus comprising:
   a first tank comprising:
   a first storage chamber configured to store liquid;
   a liquid supply port through which the liquid in the first storage chamber is configured to be supplied; and
   a first air communication portion configured to allow the first storage chamber to communicate with an atmosphere;
   a second tank comprising:
   a liquid inlet port through which the liquid supplied through the liquid supply port is configured to be introduced;
   a second storage chamber configured to store the liquid introduced through the liquid inlet port, the second storage chamber defining a depth in a depthwise direction perpendicular to a vertical direction, the depthwise direction including a first depthwise direction and a second depthwise direction opposite to each other;
   a liquid outlet port through which the liquid stored in the second storage chamber is configured to be discharged; and
   a second air communication portion configured to allow the second storage chamber to communicate with the atmosphere; and
   a recording head in communication with the liquid outlet port through a liquid channel, the recording head having a nozzle through which the liquid supplied through the liquid channel is configured to be ejected,
   wherein the second storage chamber is positioned further in the first depthwise direction relative to the nozzle, and the second storage chamber including a liquid-storage space and an air-communication space, the liquid-storage space being defined as a space positioned below a liquid level provided by a stipulated maximum amount of liquid that can be stored in the second storage chamber, the air-communication space being defined as a space positioned above the liquid level of the liquid;
   wherein the liquid inlet port and the liquid outlet port are in communication with the liquid-storage space;
   wherein the first storage chamber is partitioned by a wall portion into an upper space above the wall portion and a lower space below the wall portion, the wall portion extending in the first depthwise direction from a partitioning surface defining the first storage chamber and facing in the first depthwise direction, the wall portion having a gap through which the upper space and the lower space are allowed to communicate with each other;
   wherein the liquid supply port is in communication with the lower space of the first storage chamber; and
   wherein the air-communication space of the second storage chamber has a prescribed portion positioned further in the second depthwise direction relative to the liquid outlet port, the prescribed portion of the air-communication space of the second storage chamber having a volume greater than a sum of a volume of the lower space of the first storage chamber and a volume of a portion of the liquid-storage space positioned further in the first depthwise direction relative to the liquid outlet port.

2. The image-recording apparatus according to claim 1, wherein the gap is positioned above a liquid level provided by a stipulated maximum amount of liquid that can be stored in the first storage chamber in a state where the image-recording apparatus is disposed in such an orientation that the partitioning surface faces upward in the vertical direction.

3. The image-recording apparatus according to claim 1, wherein the liquid supply port is provided at the partitioning surface.

4. The image-recording apparatus according to claim 1, wherein the second air communication portion allows the air-communication space to communicate with the atmosphere at a position further in the second depthwise direction relative to the liquid outlet port, the second air communication portion comprising a semipermeable membrane.

* * * * *